US012668359B2

(12) United States Patent
Cravener et al.

(10) Patent No.: US 12,668,359 B2
(45) Date of Patent: Jun. 30, 2026

(54) UNIVERSAL-JOINT ROTOR-HUB METHOD AND SYSTEM

(71) Applicant: Textron Innovations Inc., Providence, RI (US)

(72) Inventors: Kyle Thomas Cravener, Arlington, TX (US); Andrew Harloff, Fort Worth, TX (US); Andrew Maresh, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 416 days.

(21) Appl. No.: 18/115,220

(22) Filed: Feb. 28, 2023

(65) Prior Publication Data

US 2024/0286741 A1     Aug. 29, 2024

(51) Int. Cl.
| | |
|---|---|
| *B64C 11/02* | (2006.01) |
| *B64C 11/28* | (2006.01) |
| *B64C 29/00* | (2006.01) |
| *F16D 3/38* | (2006.01) |

(52) U.S. Cl.
CPC .......... *B64C 29/0033* (2013.01); *B64C 11/02* (2013.01); *B64C 11/28* (2013.01); *F16D 3/38* (2013.01)

(58) Field of Classification Search
CPC . B64C 11/02; B64C 27/35; F16D 3/38; F16L 27/023
See application file for complete search history.

(56) References Cited

U.S. PATENT DOCUMENTS

| | | | | | |
|---|---|---|---|---|---|
| 1,256,871 | A | * | 2/1918 | Burrt | F16D 3/38 464/112 |
| 3,792,598 | A | * | 2/1974 | Orain | F16D 3/207 464/111 |
| 3,877,251 | A | * | 4/1975 | Wahlmark | F16D 3/207 464/115 |
| 4,229,871 | A | * | 10/1980 | Orain | F16D 3/207 29/451 |
| 4,477,224 | A | * | 10/1984 | Watson | B64C 27/59 416/114 |
| 4,886,479 | A | * | 12/1989 | Richtmeyer | F16D 3/2055 464/111 |
| 5,011,373 | A | | 4/1991 | Aubry et al. | |

(Continued)

FOREIGN PATENT DOCUMENTS

| | | | | |
|---|---|---|---|---|
| WO | WO-2024241270 A1 | * | 11/2024 | F16D 3/2055 |

OTHER PUBLICATIONS

Cravener, Kyle Thomas et al., "Anisotropic Magneto-Resistive Sensor Flap-Measuring Systems", U.S. Appl. No. 17/555,104, filed Dec. 17, 2021, 46 pages.

(Continued)

*Primary Examiner* — Brian M O'Hara
(74) *Attorney, Agent, or Firm* — Bradley Arant Boult Cummings LLP

(57) ABSTRACT
A universal-joint cross assembly includes a cross. Four compression rings are mounted at terminal positions of the cross. Each of the four compression rings is positioned at a 90° interval relative to adjacent ones of the four compression rings. The universal-joint cross assembly includes four inner balls. Each of the four inner balls is fixed to one of the four compression rings and forms a portion of a spherical bearing.

7 Claims, 19 Drawing Sheets

(56) References Cited

U.S. PATENT DOCUMENTS

| | | | |
|---|---|---|---|
| 5,749,540 | A | 5/1998 | Arlton |
| 6,616,095 | B2 | 9/2003 | Stamps et al. |
| 8,004,277 | B2 | 8/2011 | Patil et al. |
| 8,070,090 | B2 | 12/2011 | Tayman |
| 8,955,792 | B2 | 2/2015 | Schank |
| 9,605,978 | B2 | 3/2017 | Ausserlechner et al. |
| 9,657,582 | B2 | 5/2017 | Haldeman et al. |
| 9,809,303 | B2 | 11/2017 | Schank |
| 10,011,367 | B2 | 7/2018 | Dillon |
| 10,384,771 | B2 | 8/2019 | Haldeman et al. |
| 10,577,096 | B2 | 3/2020 | Roberts et al. |
| 10,829,242 | B2 | 11/2020 | Cravener et al. |
| 10,960,969 | B2 | 3/2021 | Choi et al. |
| 11,097,837 | B2 | 8/2021 | Baldwin et al. |
| 11,136,116 | B2 | 10/2021 | Maresh et al. |
| 11,604,059 | B2 | 3/2023 | Covington et al. |
| 11,761,502 | B2 * | 9/2023 | Mitsch .................. F16F 1/3821 267/154 |
| 2009/0278638 | A1 | 11/2009 | Giroud et al. |
| 2012/0053851 | A1 | 3/2012 | Baller et al. |
| 2013/0092786 | A1 | 4/2013 | Kellner |
| 2013/0243597 | A1 | 9/2013 | Perrin et al. |
| 2014/0145025 | A1 | 5/2014 | Fang et al. |
| 2014/0271188 | A1 | 9/2014 | Dillon |
| 2015/0069175 | A1 | 3/2015 | Schank |
| 2015/0210382 | A1 | 7/2015 | Dempsey et al. |
| 2016/0224030 | A1 | 8/2016 | Wulff et al. |
| 2016/0258781 | A1 | 9/2016 | Ausserlechner et al. |
| 2017/0203838 | A1 | 7/2017 | Thomas et al. |
| 2018/0155015 | A1 | 6/2018 | Thompson et al. |
| 2021/0179263 | A1 | 6/2021 | Sayyah et al. |
| 2021/0269148 | A1 | 9/2021 | Cravener |
| 2021/0291960 | A1 | 9/2021 | Maresh et al. |

OTHER PUBLICATIONS

Cravener, Kyle Thomas, "Anistropic Magneto-Resistive Sensor Flap-Measuring on Gimballed Hub", U.S. Appl. No. 18/115,213, filed Feb. 28, 2023, 56 pages.

Cravener, Kyle Thomas et al., "Anisotropic Magneto-Resistive Sensor Flap Measuring Systems", U.S. Appl. No. 17/555,024, filed Dec. 17, 2021, 44 pages.

* cited by examiner

704

712(2)

UNIVERSAL-JOINT ROTOR-HUB METHOD AND SYSTEM

TECHNICAL FIELD

This disclosure relates in general to the field of universal joints that include a plurality of spherical bearings and more particularly, but not by way of limitation, to rotor hubs for vertical takeoff and landing ("VTOL") aircraft that employ such universal joints.

BACKGROUND

This section provides background information to facilitate a better understanding of the various aspects of the disclosure. It should be understood that the statements in this section of this document are to be read in this light, and not as admissions of prior art.

VTOL aircraft are capable of taking off, hovering, and landing vertically. Examples of VTOL aircraft include helicopters and tiltrotor aircraft, which have one or more rotors that provide lift and thrust to the aircraft. The rotors not only enable hovering and vertical takeoff and landing, but also enable forward, backward, and lateral flight. There are many rotor assembly configurations that allow for rotor blade movement during operation. VTOL aircraft often utilize a gimbaled drive joint to allow an axis of rotation of the rotor hub to vary relative to the mast axis. These gimbaled drive joints may utilize universal joints to accomplish the variable axis of rotation. Helicopters and tiltrotors may, for example, use a gimbaled proprotor hub that allows the entire hub to tilt relative to the mast during flapping while the proprotor blades remain in a substantially fixed in-plane orientation relative to the hub. VTOL aircraft may include gimbal lock devices to prevent hubs from flapping.

SUMMARY

A universal-joint cross assembly includes a cross and four compression rings mounted at terminal positions of the cross. Each of the four compression rings is positioned at a 90° interval relative to adjacent ones of the four compression rings. The universal-joint cross assembly includes four inner balls. Each of the four inner balls is fixed to one of the four compression rings and forms a portion of a spherical bearing.

A spherical-bearing assembly includes a cross assembly, four inner balls, and four outer-ring assemblies. The cross assembly includes a cross comprising a ring and four compression rings. Each of the four compression rings is mounted at a periphery of the ring and is positioned at a 90° interval relative to adjacent ones of the four compression rings. Each of the four inner balls is fixed to one of the four compression rings. Each of the four outer-ring assemblies holds captive one of the four inner balls.

A rotor-hub spherical-bearing assembly includes a spherical-bearing assembly, a fork driver, and a drive plate. The spherical-bearing assembly includes a cross assembly and four outer-ring assemblies. The cross assembly includes a cross and four inner balls. The cross includes a ring and four compression rings. Each of the four compression rings is mounted at a periphery of the ring and is positioned at a 90° interval relative to adjacent ones of the four compression rings. Each of the four inner balls is fixed to one of the four compression rings. Each of the four outer-ring assemblies holds captive one of the four inner balls. A first opposing pair of the four outer-ring assemblies are mounted to the fork driver. A second opposing pair of the four outer-ring assemblies are mounted to the drive plate.

This summary is provided to introduce a selection of concepts that are further described below in the Detailed Description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following Detailed Description when read with the accompanying Figures. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1A:
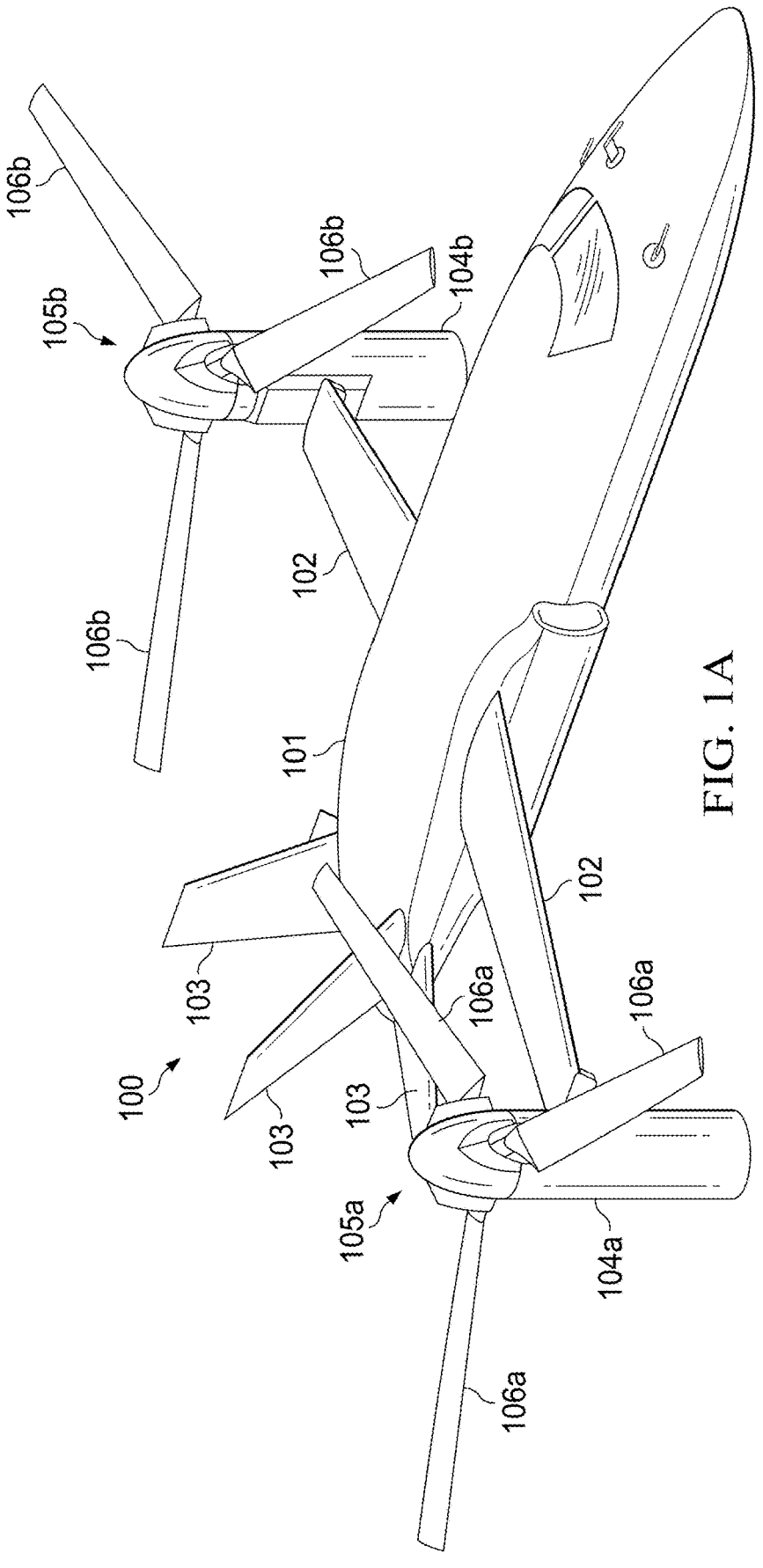
FIGS. 1A-1C illustrate a tiltrotor aircraft in various flight modes, including helicopter mode, proprotor forward-flight mode, and jet mode.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a Figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following Detailed Description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 1B:
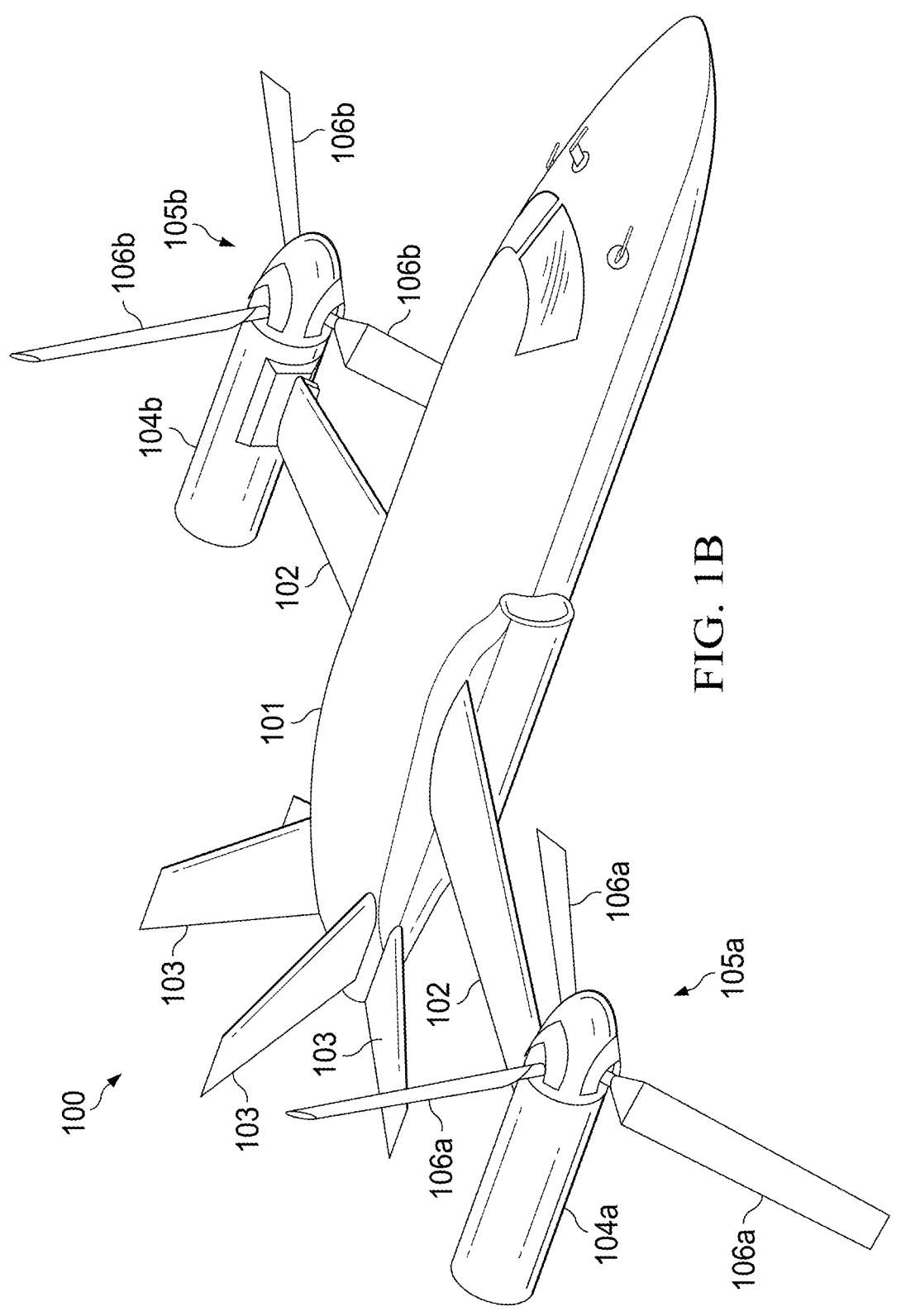
Figure 1C:
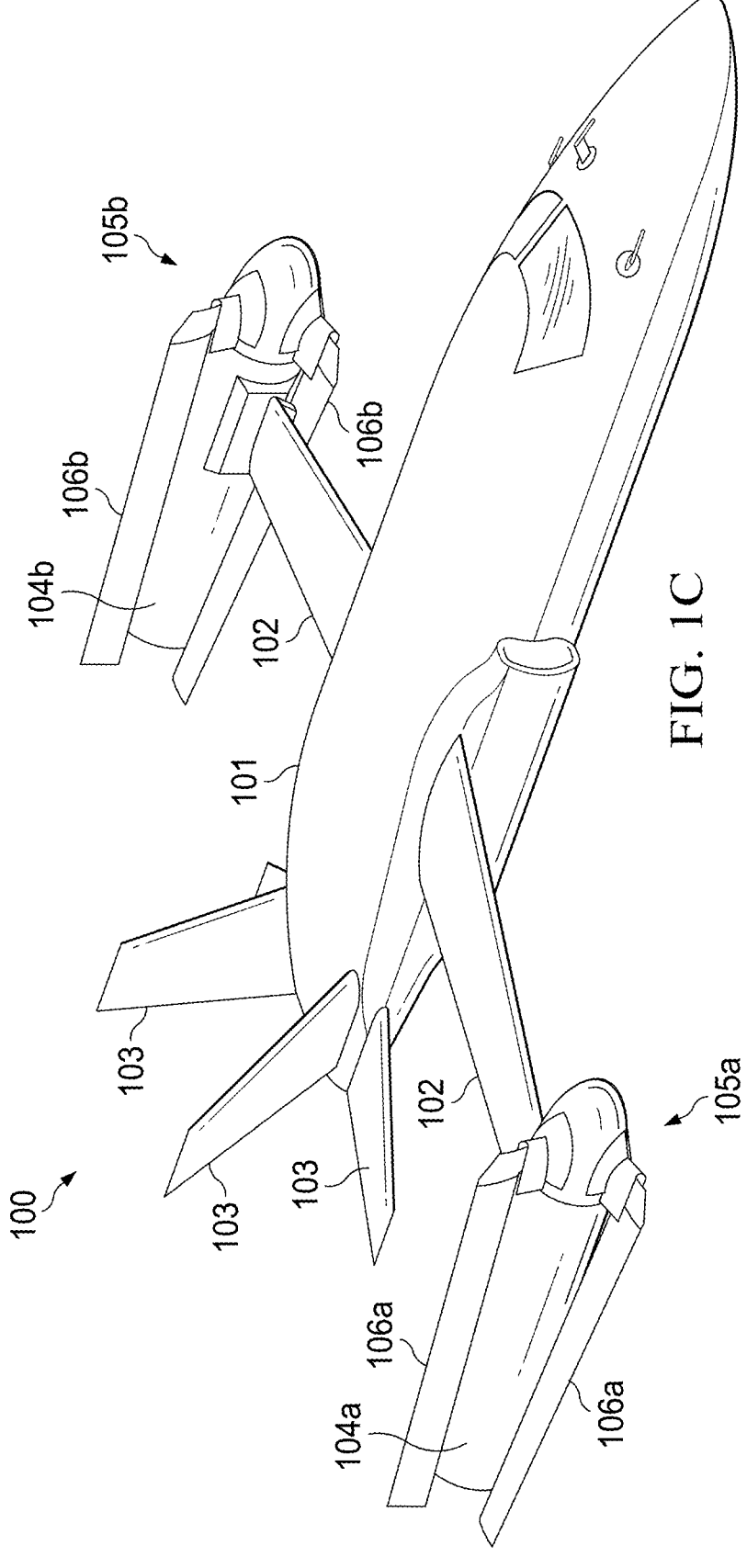

Referring to FIGS. 1A-1C, a tiltrotor aircraft is schematically illustrated and generally designated 100. The aircraft 100 includes a fuselage 101, wings 102, and a tail assembly 103. The wings 102 and the tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at outboard ends of the wings 102 and are rotatable relative to the wings 102 between a generally vertical orientation, as best seen in FIG. 1A, and a generally horizontal orientation, as best seen in FIGS. 1B and 1C. The entire pylon assembly 104a, 104b may rotate relative to the wing 102, as illustrated in FIGS. 1A-1C. In other embodiments, the pylon assemblies 104a, 104b may comprise a fixed portion that is attached to the wing 102 and a moveable portion that rotates or pivots relative to the wing 102.

The pylon assemblies 104a, 104b each house a portion of a drive system that is used to rotate proprotor assemblies 105a, 105b, respectively. The drive system may comprise, for example, engines within the fuselage 101 that are coupled to each of the proprotor assemblies 105a, 105b via linkages in the wing 102 and the pylon assemblies 104a, 104b. Each proprotor assembly 105a, 105b includes a plurality of proprotor blades 106a, 106b that are operable to be rotated, operable to be feathered, and operable to be folded.

FIG. 1A illustrates the aircraft 100 in VTOL or helicopter flight mode, in which mode the pylon assemblies 104a, 104b are configured in a vertical position and the proprotor blades 106a, 106b rotate in a substantially horizontal plane to provide a lifting thrust, such that the aircraft 100 flies in similar fashion to a conventional helicopter.

FIG. 1B illustrates the aircraft 100 in a proprotor forward-flight mode, in which the pylon assemblies 104a, 104b have been rotated forward to a horizontal position so that the proprotor blades 106a, 106b rotate in a substantially vertical plane to provide forward thrust, thereby enabling the wings 102 to provide lifting force responsive to forward airspeed, such that the aircraft 100 flies in similar fashion to a conventional propeller-driven fixed-wing aircraft.

In the rotary flight modes, the proprotor assemblies 105a, 105b rotate in opposite directions to provide torque balancing to the aircraft 100. For example, when viewed from the front of the aircraft 100 in the proprotor forward-flight mode (FIG. 1B) or from the top in the helicopter mode (FIG. 1A), the proprotor assembly 105a may rotate clockwise, for example, and the proprotor assembly 105b may rotate counterclockwise. In the illustrated embodiment, the proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that the aircraft 100 can be operated such that the proprotor assemblies 105a, 105b are selectively positioned between the proprotor forward-flight mode and the helicopter mode, which can be referred to as a conversion flight mode.

While in the configuration illustrated in FIG. 1B, the aircraft 100 may transition between the proprotor forward-flight mode and a thrust-driven forward-flight mode (i.e., jet mode). A thrust engine (not shown) in the fuselage 101 is engaged and jet thrust initially supplements the proprotor assemblies 105a, 105b. The proprotor assemblies 105a, 105b are then disengaged from their power source such as the thrust engine or a separate lift engine in the fuselage 101. The proprotor blades 106a, 106b of the proprotor assemblies 105a, 105b are then feathered (i.e., oriented to be streamlined relative to the direction of flight). In the feathered position, the proprotor blades 106a, 106b may act as brakes to aerodynamically stop the rotation of the proprotor assemblies 105a, 105b.

FIG. 1C illustrates the aircraft 100 in the jet mode, in which the proprotor blades 106a, 106b of the proprotor assemblies 105a, 105b have been folded to be oriented substantially parallel to respective ones of the pylon assemblies 104a, 104b. This configuration minimizes the drag force generated by the proprotor blades 106b, 106c. The forward cruising speed of the aircraft 100 can be significantly higher in the jet mode versus the proprotor flight mode by reducing airspeed-induced proprotor aeroelastic instability. In this configuration, the thrust engine provides forward thrust for the aircraft 100, thereby enabling the wings 102 to provide a lifting force responsive to forward airspeed. In VTOL mode, the proprotor assemblies 105a, 105b allow for flapping of the proprotor blades 106a, 106b; however, before folding the proprotor blades 106a, 106b for the jet mode, the proprotor assemblies 105a, 105b are locked in order to prevent flapping, for example, during and after folding of the proprotor blades. Apparatus for folding proprotor blades on a stop-fold aircraft are disclosed, for example, in U.S. Pat. Nos. 8,998,125, 10,336,447, and 10,526,068, the disclosures of which are incorporated by reference.

The aircraft 100 may also transition from the folded proprotor blade configuration of FIG. 1C back to proprotor flight by slowing below a maximum airspeed for proprotor deployment. The proprotor blades 106a, 106b may then be swept forward into a feathered configuration. Once all of the proprotor blades 106a, 106b have been deployed forward and locked into place (as illustrated in FIG. 1B), the engine may again engage the proprotor assemblies 105a, 105b. When torque power is applied to rotate the proprotor blades 106a, 106b, the aircraft 100 enters proprotor flight mode. The aircraft 100 may then transition to a conversion flight mode or helicopter flight mode by rotating the proprotor assembly 105a, 105b on the pylon assemblies 104a, 104b from a horizontal orientation (FIG. 1B) to a vertical orientation (FIG. 1A).

It will be understood by those having ordinary skill in the art that other engine arrangements are possible and are considered to be within the scope of the present disclosure. For example, in another embodiment, the aircraft 100 may have multiple lift engines that provide torque and rotational energy separately to each proprotor assembly 105a and 105b. In addition, even though the proprotor assemblies 105a, 105b are illustrated in the context of the aircraft 100, it should be understood by those having ordinary skill in the art that the proprotor assemblies disclosed herein can be implemented on other tiltrotor aircraft having multiple wings 102 and other proprotor assembly configurations.

Designs of rotors and propellers for tiltrotor aircraft are often complex. A large number of factors must be considered, including flexure of the rotor under heavy loads and the required motions of the proprotor blades with respect to the drive mechanism. The considerations for proprotors, used as both propellers and rotors in aircraft, such as the aircraft 100, can be more complex than usual. Gimbaled rotors may be used in such aircraft. In a gimbaled rotor, joints must be provided between a drive shaft or mast that carries torque from the engine and a yoke that drives the proprotor blades, thereby giving rise to a complex hub assembly.

Figure 2:
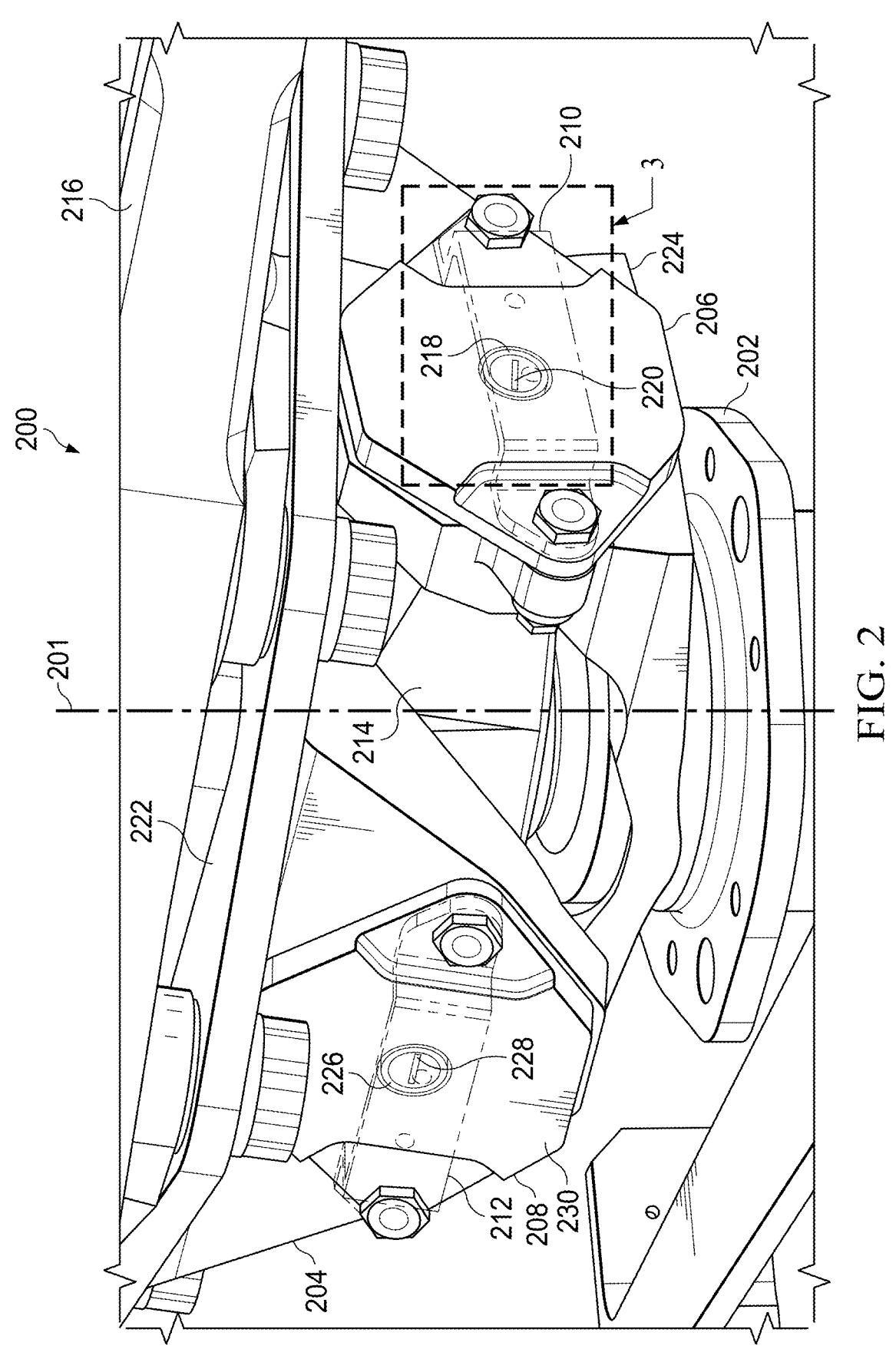
FIG. 2 illustrates a rotor hub according to an illustrative embodiment.

FIG. 2 illustrates a gimballed rotor hub 200 that utilizes a plurality of AMR sensors. The rotor hub 200 includes a fork driver 202 fixedly couplable, for example, to a rotor mast that rotates about a main-rotor axis 201. The rotor hub 200 includes a drive plate 204 that also rotates about the main-rotor axis 201. The rotor hub 200 may rotate out of a plane perpendicular to the main-rotor axis 201, such rotation being indicative of flapping. A top surface 222 of the drive plate 204 is also illustrated. In a typical embodiment, the top surface 222 includes a planar surface that is perpendicular to the main-rotor axis 201 when no flapping is occurring. The drive plate 204 is shown bolted to a yoke 216, only a portion of which is shown. The yoke 216 is coupled to a plurality of proprotor blades (not shown).

The fork driver 202 has a cap 206 fixedly attached to an external surface thereof, while the drive plate 204 has a cap 208 fixedly attached to an external surface thereof. An AMR sensor assembly 210 is carried by a bracket attached to an external surface of the cap 206. In similar fashion, an AMR sensor assembly 212 is carried by a bracket attached to an external surface of the cap 208. AMR sensor assemblies corresponding to the AMR sensor assemblies 210 and 212 may be included on opposite sides of the rotor hub 200, such that identical AMR sensor assemblies are on opposite sides thereof from one another in a mirrored configuration. Each of the AMR sensor assembly 210 and the AMR sensor assembly 212 is illustrated as translucent in order to better demonstrate various aspects of the rotor hub 200 and includes an AMR sensor that can detect rotational movement of a magnet in proximity to the AMR sensor. Also shown is a portion of a cross 214 of a universal joint of the rotor hub 200, which universal joint permits the rotor hub 200 to flap. In operation, AMR sensors of the AMR sensor assemblies 210 and 212 measure rotation of a corresponding magnet in proximity thereto.

Figure 3:
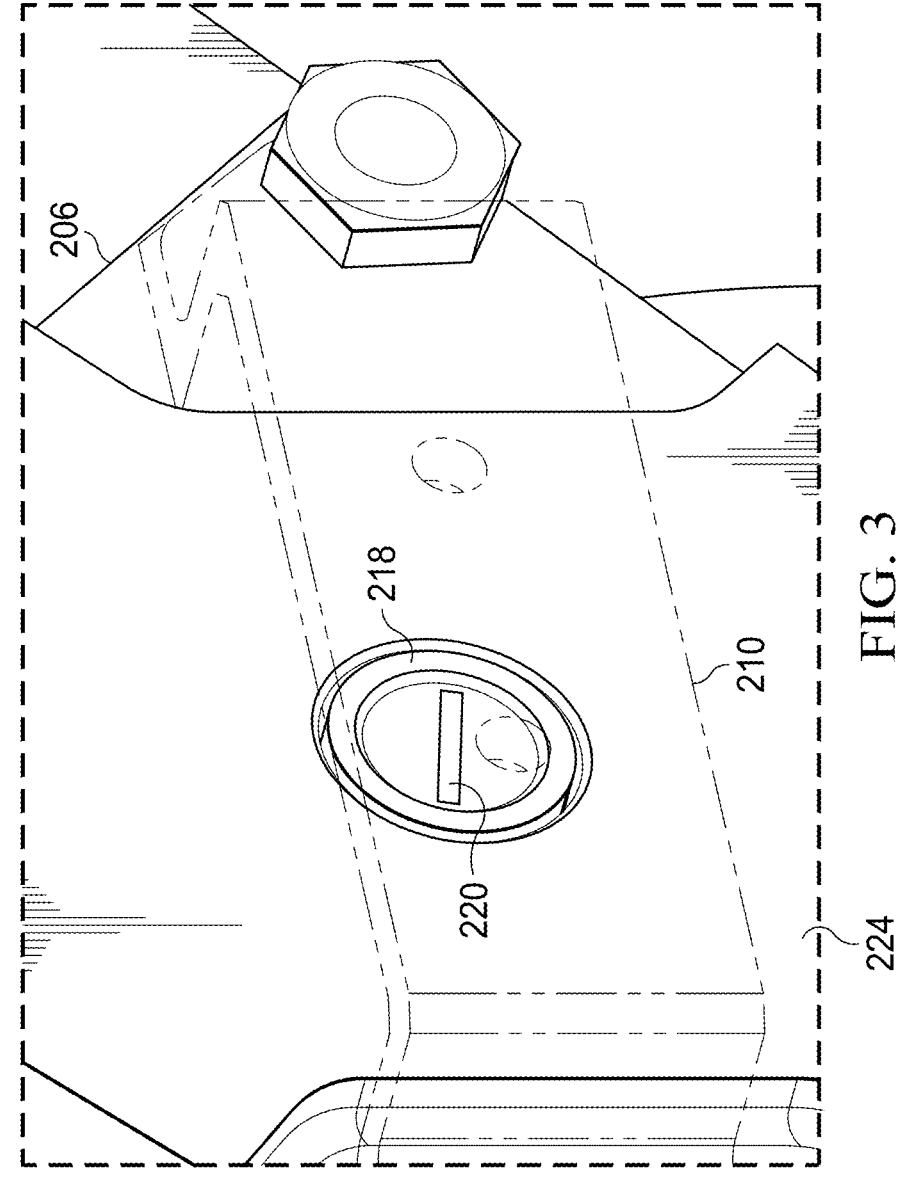
FIG. 3 illustrates in more detail aspects of the rotor hub of FIG. 2.

In FIG. 2, a magnet 218 is shown on the cap 206. The magnet 218 has shown thereon a line 220. The line 220 is illustrated as substantially parallel to an amount of rotation of the magnet 218 about an axis perpendicular to a face plane 224 of the cap 206 and the bracket of the AMR sensor assembly 210, the axis corresponding to a rotational axis of a trunnion of the cross 214. In other words, as the magnet 218, which is positioned in proximity to an AMR sensor of the AMR sensor assembly 210 and is fixedly coupled to the cross 214, rotates about the axis perpendicular to the face plane 224, the AMR sensor of the AMR sensor assembly 210 detects relative rotational movement between the AMR sensor and the magnet 218, such relative movement being indicative of flapping about the rotational axis of the trunnion of the cross 214. It will be understood that the line 220 is shown for illustrative purposes only. FIG. 3 illustrates a portion of the cap 206, the AMR sensor assembly 210, the magnet 218, the line 220, and the face plane 224 in greater detail.

Figure 4:
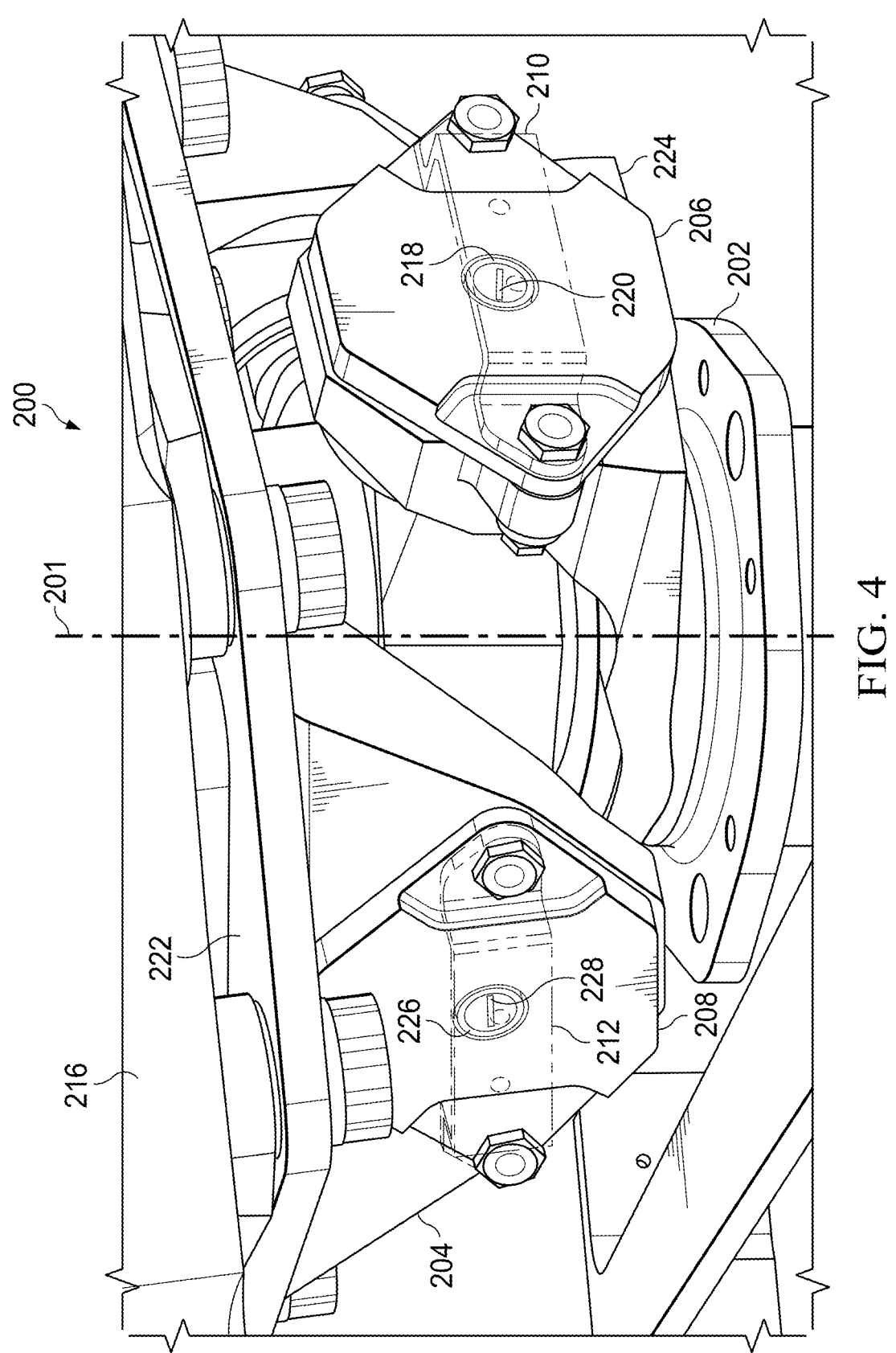
FIG. 4 illustrates the rotor hub of FIG. 2 in a different flapping position.

In similar fashion, a magnet 226 is shown on the cap 208. The magnet 226 has shown thereon a line 228. The line 228 is illustrated as substantially parallel to an amount of rotation of the magnet 226 about an axis perpendicular to a face plane 230 of the cap 208 and the bracket of the AMR sensor assembly 212, the axis corresponding to a rotational axis of a trunnion of the cross 214. In other words, as the magnet 226, which is positioned in proximity to an AMR sensor of the AMR sensor assembly 212 and is fixedly coupled to the cross 214, rotates about the axis perpendicular to the face plane 230, the AMR sensor of the AMR sensor assembly 212 detects relative rotational movement between the AMR sensor and the magnet 226, such relative rotational movement being indicative of flapping about the rotational axis of the trunnion of the cross 214. It will be understood that the line 228 is shown for illustrative purposes only and need not be included for the rotor hub 200 to operate properly. FIG. 4 illustrates the rotor hub 200 in a different flapping position from that shown in FIG. 2 as indicated by the lines 220 and 228.

Figure 5:
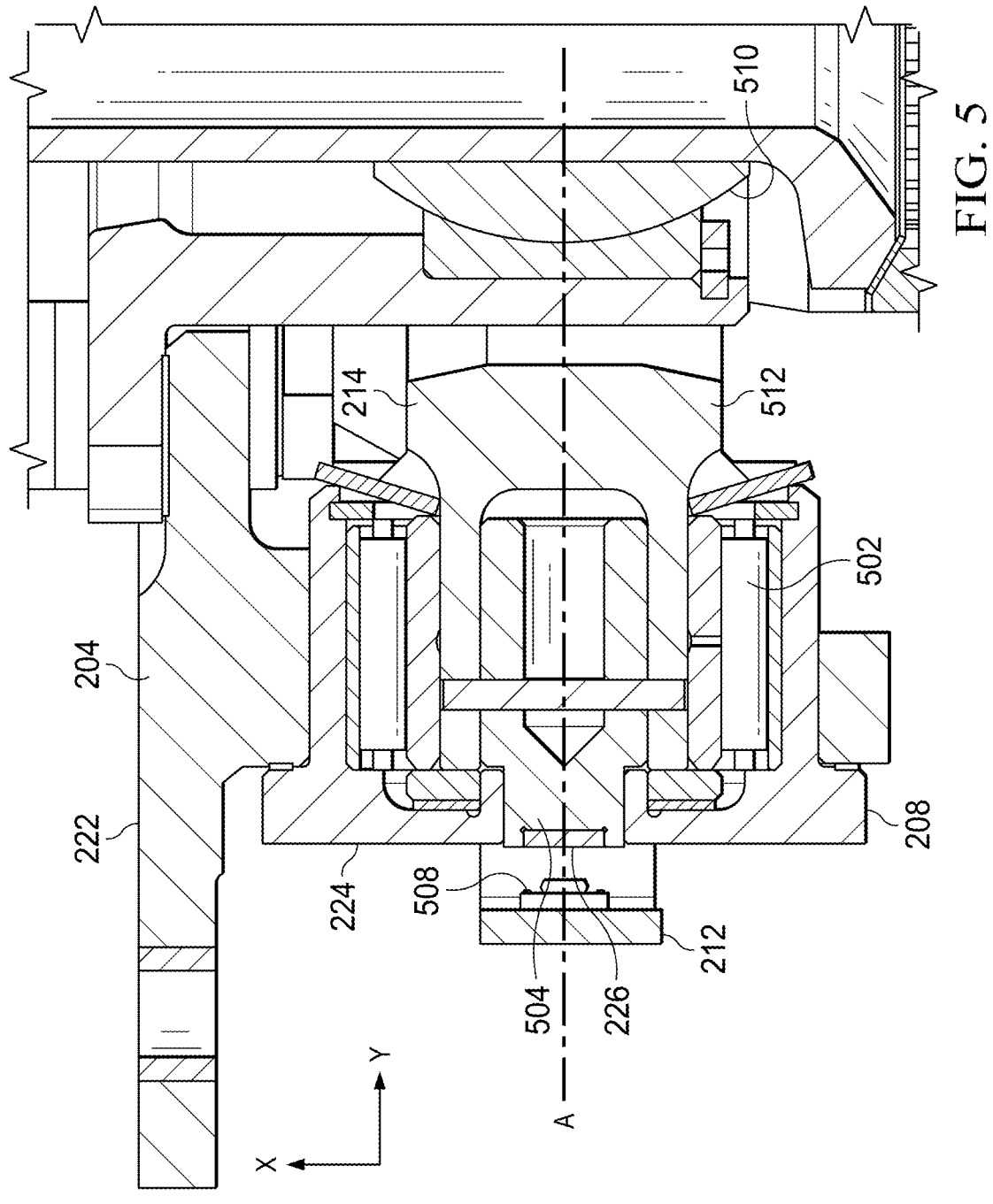
FIG. 5 is a cross-sectional side view of a drive plate, a cap, an AMR sensor assembly, and associated components of the rotor hub of FIG. 2.

FIG. 5 is a cross-sectional side view of the drive plate 204, the cap 208, the AMR sensor assembly 212, and associated components. As illustrated in FIG. 5, the drive plate 204 is shown such that the top surface 222 of the drive plate 204 is parallel to the y axis, which axis is perpendicular to the face plane 224. In similar fashion, the x axis is parallel to the main-rotor axis 114. Rotation of the drive plate 204 about a rotational axis A, which axis is parallel to the y axis is detected by relative rotation of the magnet 226 and an AMR sensor 508.

The AMR sensor 508 is part of the AMR sensor assembly 212 and is mounted to a bracket as shown. The magnet 226 is mounted to a spacer 504. A portion of a center spherical bearing 510 is also shown. The spacer 504 is fixedly connected to a trunnion 512. In some embodiments, no spacer is used and the magnet 226 is mounted directly to the trunnion 512. A bearing assembly 502, which may include, for example, needle bearings and bearing races, permits the drive plate 204 to rotate about the axis A relative to the trunnion 512, which rotation causes the AMR sensor 508 to rotate about the same axis, thereby resulting in relative rotational movement of the AMR sensor 508 and the magnet 226. Those having skill in the art will appreciate that operation of the AMR sensor assembly 210 relative to a respective trunnion of the cross 214 is analogous to that described herein relative to FIG. 5 in that relative AMR-sensor-magnet rotation occurs.

In some embodiments of the rotor hub 200, only a single AMR sensor and magnet are utilized. In such cases, so long as measurements can be correlated to an azimuthal position of rotation of the rotor hub 200 about the main-rotor axis 201, amplitude and direction of flapping can be determined. However, if two or more pairs of AMR sensors and magnets are utilized, more instantaneous measurements of flapping can be made.

Figure 6:
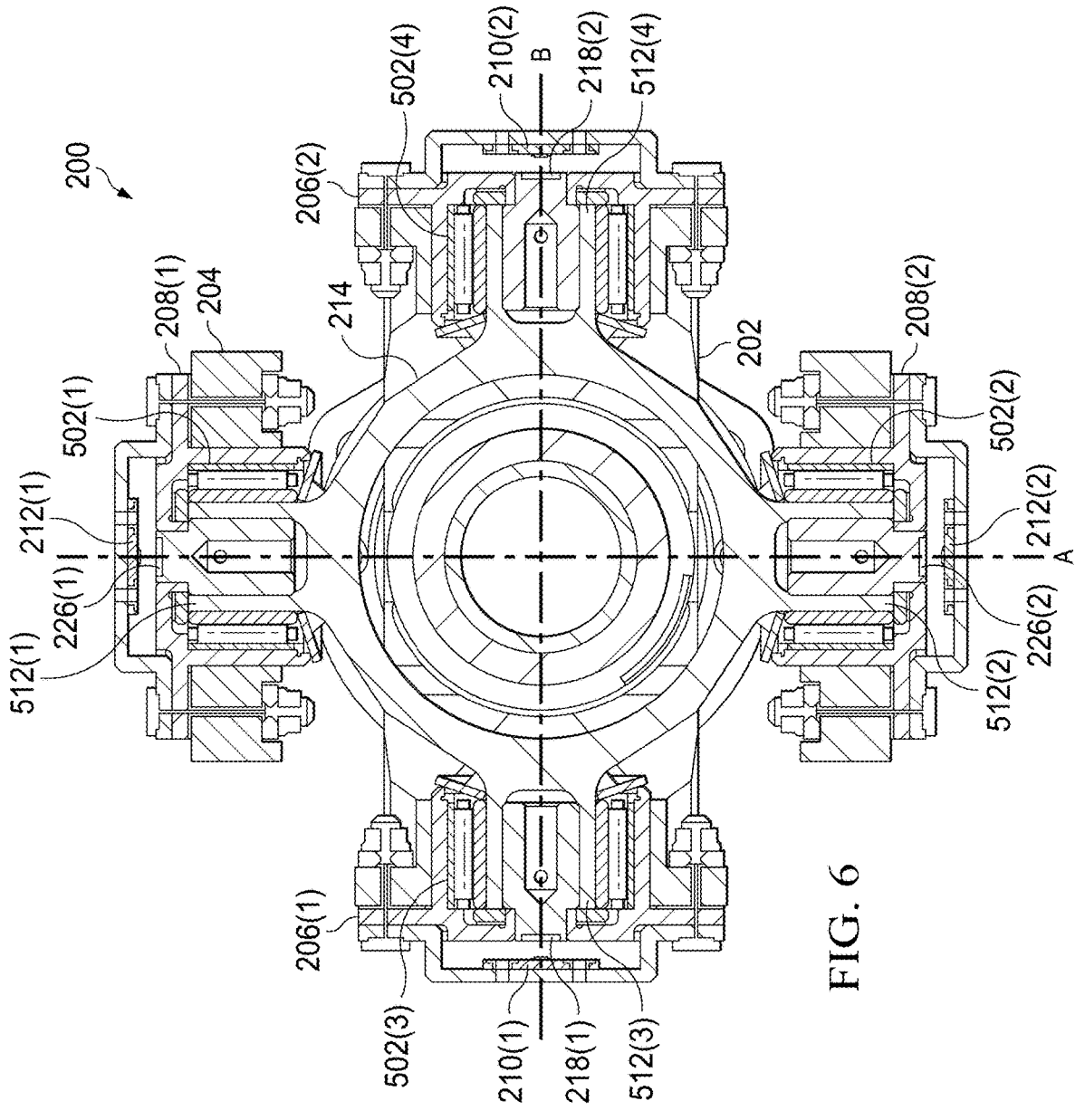
FIG. 6 is a cross-sectional plan view of the rotor hub of FIG. 2.

FIG. 6 is a cross-sectional plan view of the rotor hub 200. The cross-section passes through the rotational axes of the four trunnions of the cross 214, respective trunnions 512 (1)-(4) being shown arranged in 90° azimuthal increments in a plane perpendicular to the main-rotor axis 201 such that no flapping out of the plane is occurring. A rotational axis A and a rotational axis B are shown perpendicular to one another. Bearing assemblies 502(1)-(4) are illustrated associated with respective ones of the trunnions 512(1)-(4).

The fork driver 202 has coupled thereto on opposite sides thereof a cap 206(1) and a cap 206(2), a magnet 218(1) and a magnet 218(2), and an AMR sensor assembly 210(1) and an AMR sensor assembly 210(2), respective opposing components being associated with one of the trunnions 512(3) or 512(4). Thus, rotation of the trunnions 512(3) and 512(4) about the axis B may be detected.

In similar fashion, the drive plate 204 has coupled thereto on opposite sides thereof a cap 208(1) and a cap 208(2), a magnet 226(1) and a magnet 226(2), and an AMR sensor assembly 212(1) and an AMR sensor assembly 212(2), respective opposing components being associated with one of trunnions 512(1) or 512(2). Thus rotation of the trunnions 512(1) and 512(2) about the axis A may be detected.

Figure 7:
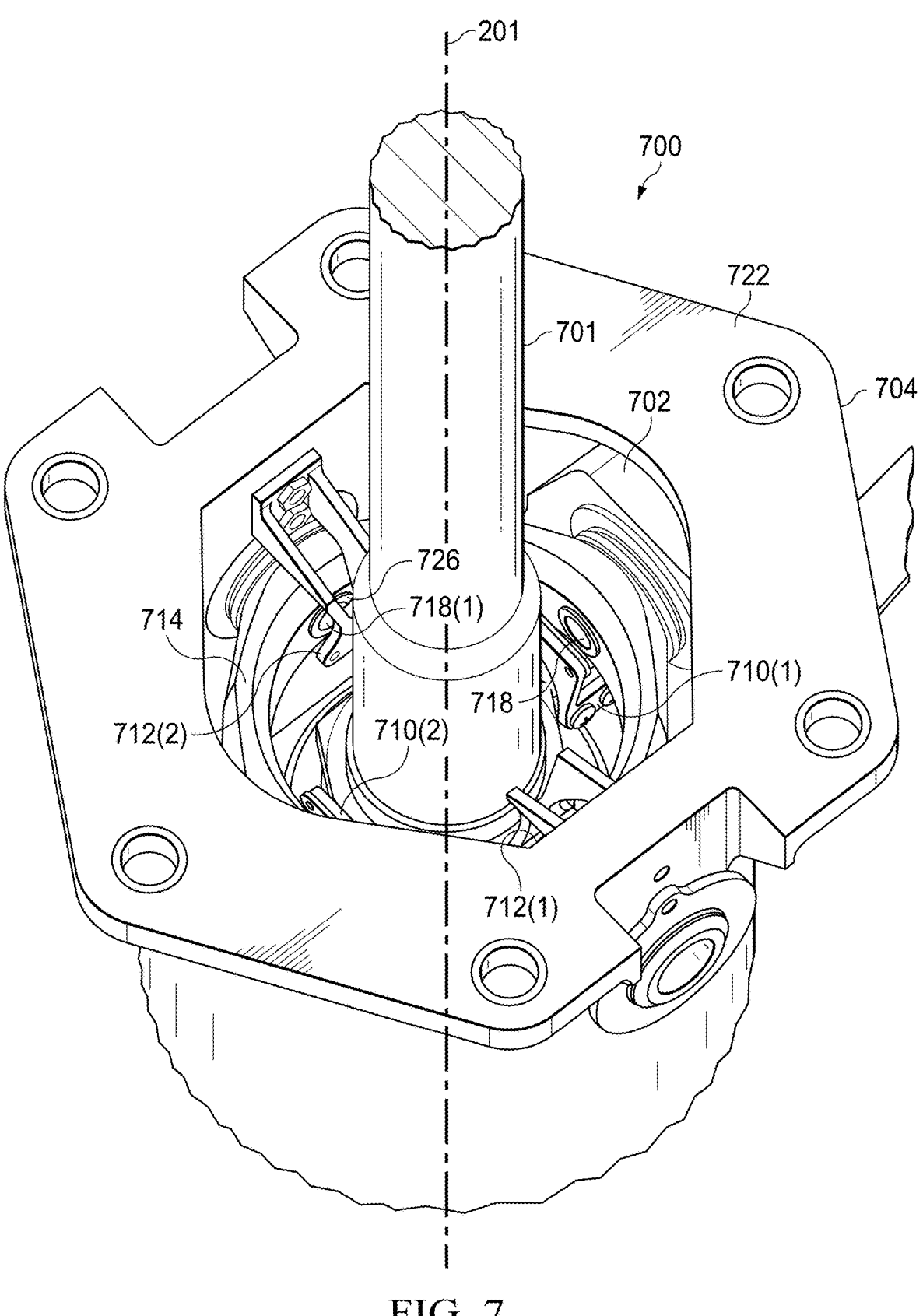
FIG. 7 is a top perspective view of a rotor hub according to an illustrative embodiment.

FIG. 7 illustrates a gimballed rotor hub 700 that utilizes a plurality of AMR sensors. The rotor hub 700 includes a fork driver 702 fixedly couplable, for example, to a rotor mast 701 and that rotates with the rotor mast 701 about the main-rotor axis 201.

The rotor hub 700 also includes a drive plate 704 that also rotates about the main-rotor axis 201; however, in contrast to the fork driver 702, the drive plate 704 may also rotate out of a plane perpendicular to the main-rotor axis 201, such rotation being indicative of flapping of the rotor hub 700. A top surface 722 of the drive plate 704 is also illustrated. In a typical embodiment, the top surface 722 includes a planar surface that is perpendicular to the main-rotor axis 201 when no flapping is occurring. The drive plate 704 is typically bolted to a yoke coupled to a plurality of proprotor blades (not shown).

Figure 8:
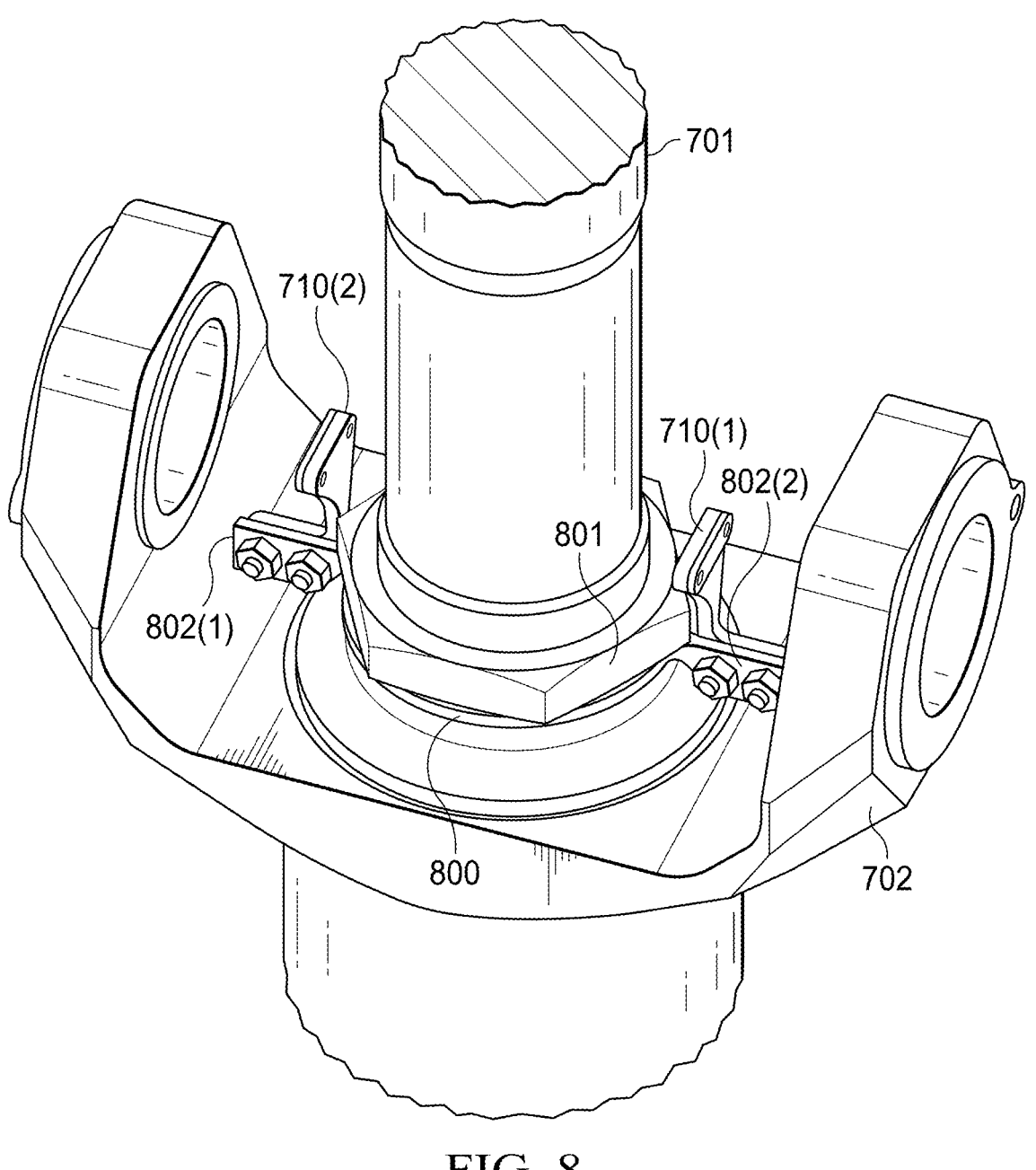
FIG. 8 is a top perspective view of a fork driver and associated components.

The fork driver 702 has AMR sensor assemblies 710(1) and 710(2) carried by respective brackets attached to an internal surface of the fork driver 702 and thereby rigidly coupled to the rotor mast 701. In similar fashion, AMR sensor assemblies 712(1) and 712(2) are carried by respective brackets attached to an internal surface of the drive plate 704. As illustrated in FIG. 8, the AMR sensor assemblies 710(1) and 710(2) and 712(1) and 712(2) are positioned on opposite sides of the rotor hub 700, such that identical AMR sensor assemblies are on opposite sides thereof from one another in a mirrored configuration. Each of the AMR sensor assemblies 710(1) and 710(2) and the AMR sensor assemblies 712(1) and 712(2) includes an AMR sensor that can detect rotational movement of a magnet in proximity to the respective AMR sensor. Also shown is a portion of a cross 714 of a universal joint of the rotor hub 700, which universal joint permits the rotor hub 700 to flap. In operation, AMR sensors of the AMR sensor assemblies 710(1) and 710(2) and 712(1) and 712(2) measure rotation of a corresponding magnet in proximity thereto.

In FIG. 7, a magnet 718 is shown on an internal surface of the fork driver 702. Rotation of the magnet 718 about an axis formed by the AMR sensor of the AMR sensor assembly 710(1) and the magnet 718 corresponds to a rotational axis of a trunnion of the cross 714. In other words, as the magnet 718, which is positioned in proximity to an AMR sensor of the AMR sensor assembly 710(1) and is fixedly coupled to the cross 714, rotates about the rotational axis of the trunnion of the cross 714, the AMR sensor of the AMR sensor assembly 710(1) detects relative rotational movement between the AMR sensor and the magnet 718, such relative movement being indicative of flapping about the rotational axis of the trunnion of the cross 714. The AMR sensor assembly 710(2) and a corresponding magnet (not shown) operate in similar fashion.

In similar fashion, a magnet 726 is shown on an internal surface of the drive plate 704. Rotation of the magnet 726 about an axis formed by the AMR sensor of the AMR sensor assembly 712(1) and the magnet 726 corresponds to a rotational axis of a trunnion of the cross 714. In other words, as the magnet 726, which is positioned in proximity to an AMR sensor of the AMR sensor assembly 712(2) and is fixedly coupled to the cross 714, rotates about the rotational axis of the trunnion of the cross 714, the AMR sensor of the AMR sensor assembly 712(2) detects relative rotational movement between the AMR sensor and the magnet 726, such relative rotational movement being indicative of flapping about the rotational axis of the trunnion of the cross 714. The AMR sensor assembly 712(1) and a corresponding magnet (not shown) operate in similar fashion.

FIG. 8 is a perspective view of a fork driver and associated components. In FIG. 8, a perspective view of the fork driver 702 is shown. The AMR sensor assemblies 710(1) and 710(2) are also shown. As described above, the AMR sensor assemblies 710(1) and 710(2) are positioned so as to detect rotational movement of corresponding trunnions, for example, of the cross 714 (not shown). The brackets illustrated in FIG. 8 that support the AMR sensor assemblies 710(1) and 710(2) are shown as supported by a ring assembly 800 that is fixedly coupled to the rotor mast 701 and includes a ring 801 and arms 802(1) and 802(2) extending therefrom on opposite sides of the rotor mast 701. Thus, the fork driver 702 and the AMR sensor assemblies 710(1) and 710(2) rotate about the rotor mast 701 in unison.

Figure 9:
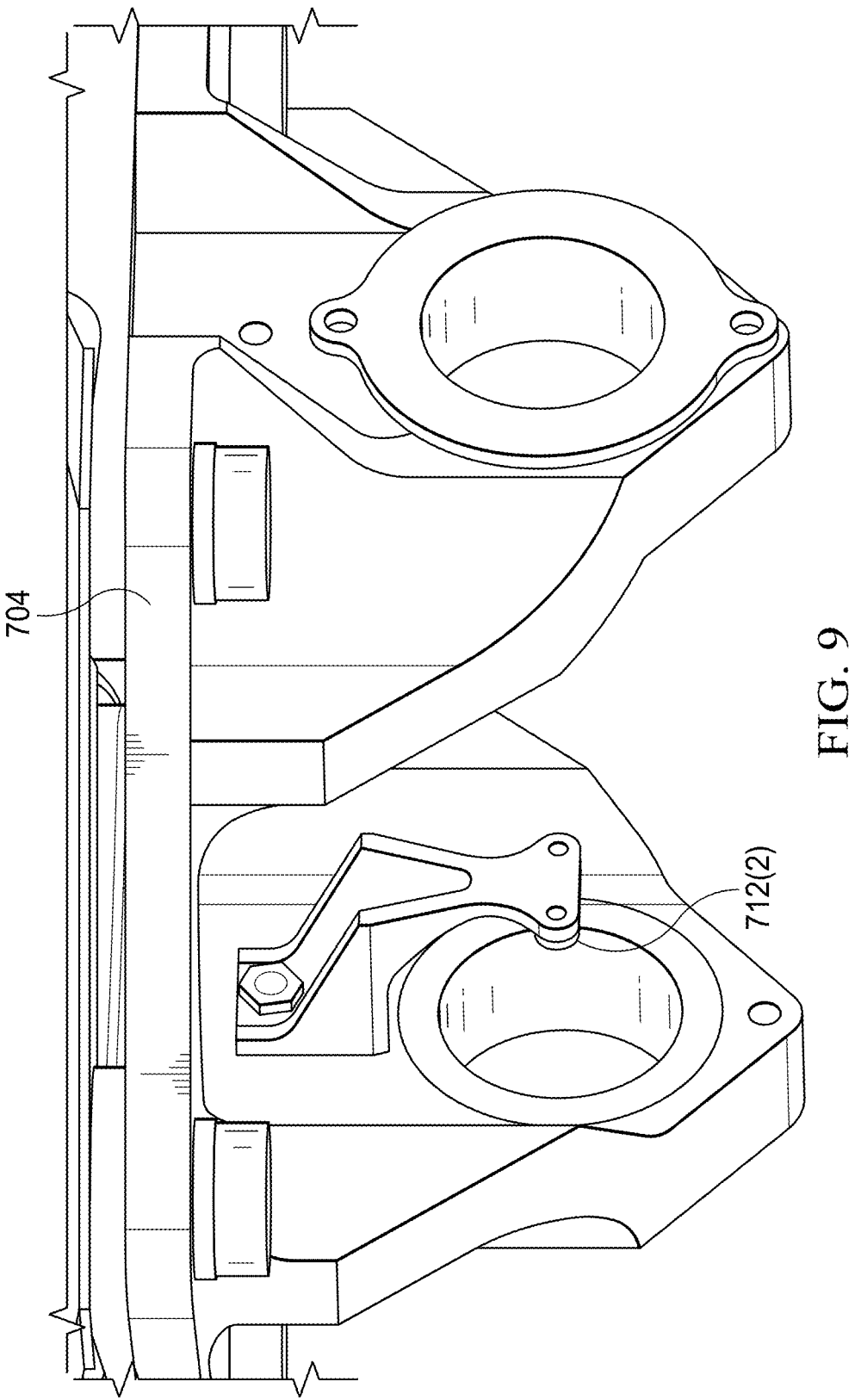
FIG. 9 is a bottom perspective view of a drive plate and associated components of the rotor hub of FIG. 7.

FIG. 9 is a bottom perspective view of the drive plate 704 and associated components of the rotor hub 700. A bracket holding the AMR sensor assembly 712(2) is shown. The cross 714 is not shown for purposes of clarity.

Figure 10:
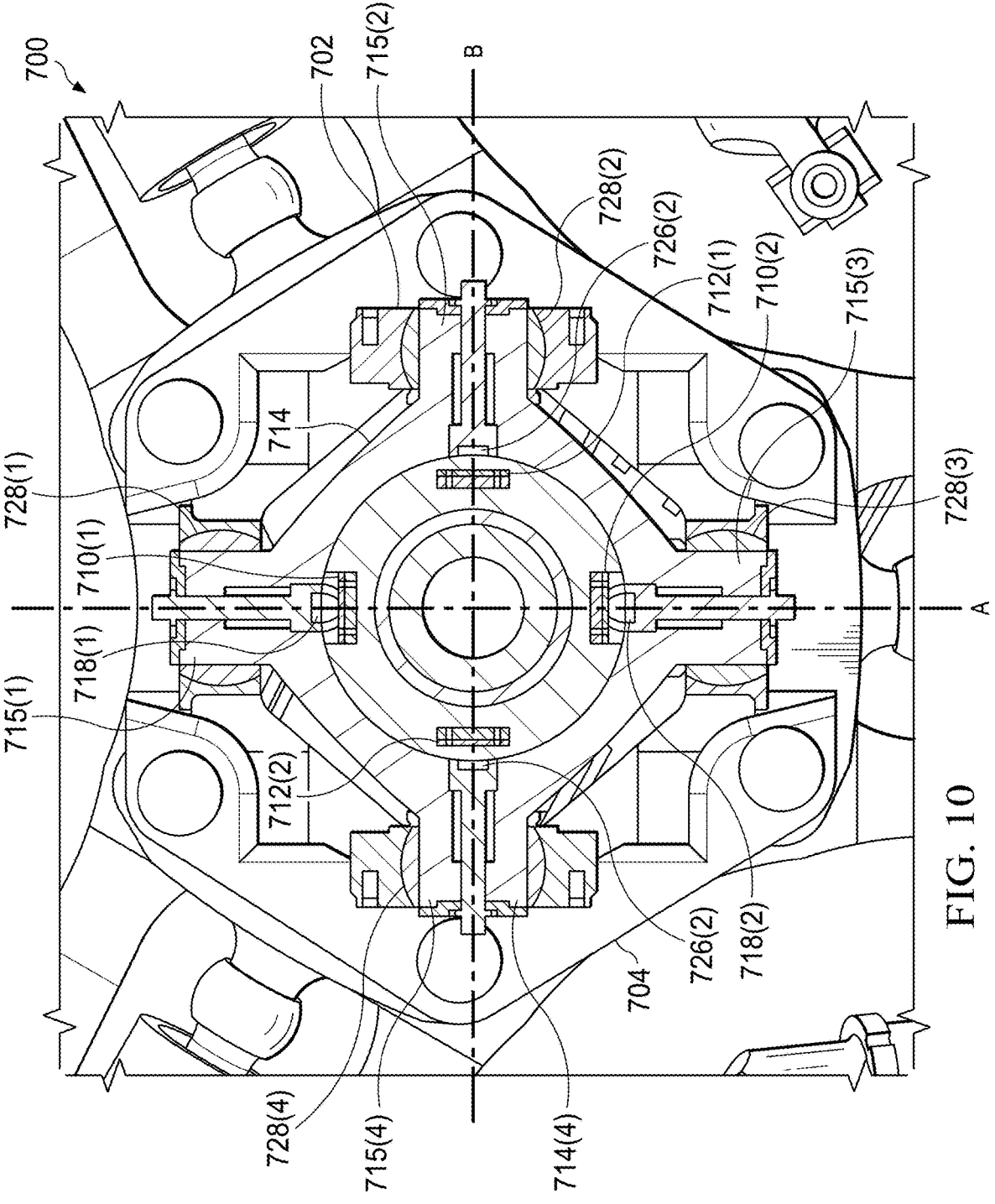
FIG. 10 is a cross-sectional plan view of the rotor hub of FIG. 7.

FIG. 10 is a cross-sectional plan view of the rotor hub 700. The cross-section passes through the rotational axes of four trunnions of the cross 714, respective trunnions 715(1)-(4) being shown arranged in 90° azimuthal increments in a plane perpendicular to the main-rotor axis 201 such that no flapping out of the plane is occurring. A rotational axis A and a rotational axis B are shown perpendicular to one another.

The drive plate 704 has coupled thereto on opposite sides thereof a magnet 718(1) and a magnet 718(2) and an AMR sensor assembly 710(1) and an AMR sensor assembly 710(2), respective opposing components being associated with one of the trunnions 715(1) or 715(3). Thus, rotation of the trunnions 715(1) and 715(3) about the axis A may be detected. Each of the trunnions 715(1) and 715(3) has associated therewith a respective bearing assembly 728(1) or 728(3), the respective bearing assemblies 728(1) and 728(3) being illustrated as spherical bearings that permit the drive plate 704 to rotate about the axis A relative to the trunnions 715(1) and 715(3) and also react loading along the axis A.

In similar fashion, the fork driver 702 has coupled thereto on opposite sides thereof a magnet 726(1) and a magnet 726(2) and an AMR sensor assembly 712(1) and an AMR sensor assembly 712(2), respective opposing components being associated with one of the trunnions 715(2) or 715(4). Thus, rotation of the trunnions 715(2) and 715(4) about the axis B may be detected. Each of the trunnions 715(2) and 715(4) has associated therewith a respective bearing assembly 728(2) or 728(4), the respective bearing assemblies 728(2) and 728(4) being illustrated as spherical bearings that permit the fork driver 702 to rotate about the axis B relative to the trunnions 715(2) and 715(4) and also react loading along the axis B.

Those having skill in the art will recognize that as few as one AMR sensor assembly and magnet may be utilized and that four or more AMR sensor assemblies and magnets may be utilized depending upon design objectives.

Due to unique operating regimes of high-speed VTOL aircraft that are operable, for example, in the jet mode, there is a requirement to lock the rotor hub so as to inhibit flapping of the rotor hub during flight. As discussed above, in such an aircraft, a gimballed rotor hub utilizes a universal joint to enable rotor-hub flapping. When flapping is restricted for jet-mode operation, the universal joint must react hub moments through loading transmitted, for example, along one or more of the axes A and B of FIGS. 6-7 and 10 above. In some solutions, needle bearings are utilized in each trunnion of a universal joint to permit the trunnion to rotate about a trunnion axis such as, for example, the axes A and B described above; however, such needle bearings handle radial loads well but are often suboptimal in reacting axial load, which performance results in a need for one or both of thrust washers and a spherical bearing in a center of a cross of the universal joint to be employed.

As illustrated in FIG. 1C, the aircraft 100 may operate in the jet mode. While operating in the jet mode, the rotor hub 200 may be locked via a hub lock to impede the rotor hub 200 from flapping. However, when the rotor hub 200 is locked, the proprotor assemblies 105a, 105b are subjected to forces that attempt to flap the rotor hub 200. These forces create a shear couple to the rotor mast 701 and form a flapping hinge on the rotor mast 701 that can cause a high degree of loading on affected bearings. This high degree of loading can cause a needle bearing, for example, of the bearing assembly 502 to wear out or fail more quickly than is optimal.

In some embodiments, needle bearings associated with each trunnion are replaced with spherical bearings. Spherical bearings are better suited than needle bearings to handle axial loading along, for example, axes A or B. Associating a spherical bearing with each trunnion of the cross of the universal joint enables a reduction in system complexity and weight. For example, no center spherical bearing as employed in some solutions is needed if each trunnion has a spherical bearing associated therewith. Spherical bearings also reduce bearing wear or failure due to axial loading during normal flight conditions in response, for example, to component misalignment. A universal joint that includes a spherical bearing associated with each trunnion may be utilized on any gimballed rotor hub that is required to restrict flapping such as, an HSVTOL or an electric VTOL aircraft.

Figure 11:
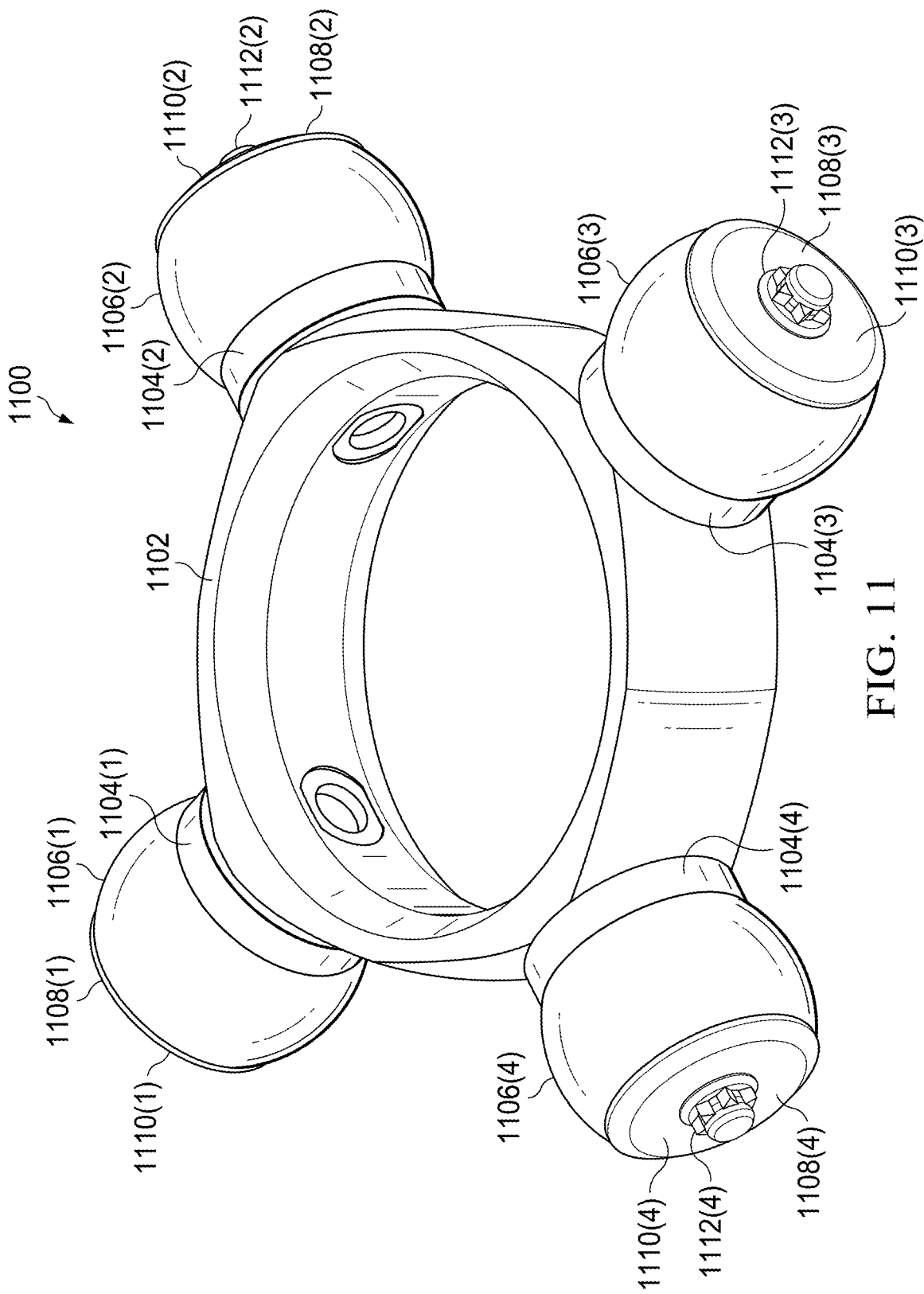
FIG. 11 is a perspective view of a cross assembly.

FIG. 11 is a perspective view of a cross assembly 1100 of a universal joint. The cross assembly 1100 includes a cross 1102. The cross 1102 is formed in a ring shape in order to permit components such as the rotor mast 701 to pass therethrough; other cross shapes may be used in accordance with design objectives such as, for example, a traditional cross shape that includes two straight rods perpendicular to one another that meet at a fixed central junction. Compression rings 1104(1)-1104(2) are positioned at 90° intervals about a periphery of the cross 1102.

Each of the compression rings 1104(1)-1104(4) has associated therewith one of four inner balls 1106(1)-1106(4). Each of the four inner balls 1106(1)-(4) is fixed to one of the four compression rings 1104(1)-1104(4) and forms a portion of a spherical bearing as discussed hereinabove. Also shown are ball caps 1108(1)-1108(4), each of which is fixed to an outboard end of a respective one of the inner balls 1106(1)-1106(4). Each of the ball caps 1108(1)-1108(4) has a respective face 1110(1)-1110(4) that is perpendicular to an axis of rotation of the cross assembly 1100 formed between opposing pairs of the compression rings 1104(1)-1104(4) and has formed therein a through hole (not shown) to permit a removable fastener to be used to mount removably the inner balls 1106(1)-1106(4) to respective ones of the compression rings 1104(1)-1104(4). Removable fasteners are illustrated in FIG. 11 as including nuts 1112(2)-1112(4), a nut associated with the face 1110(1) not being visible.

Figure 12:
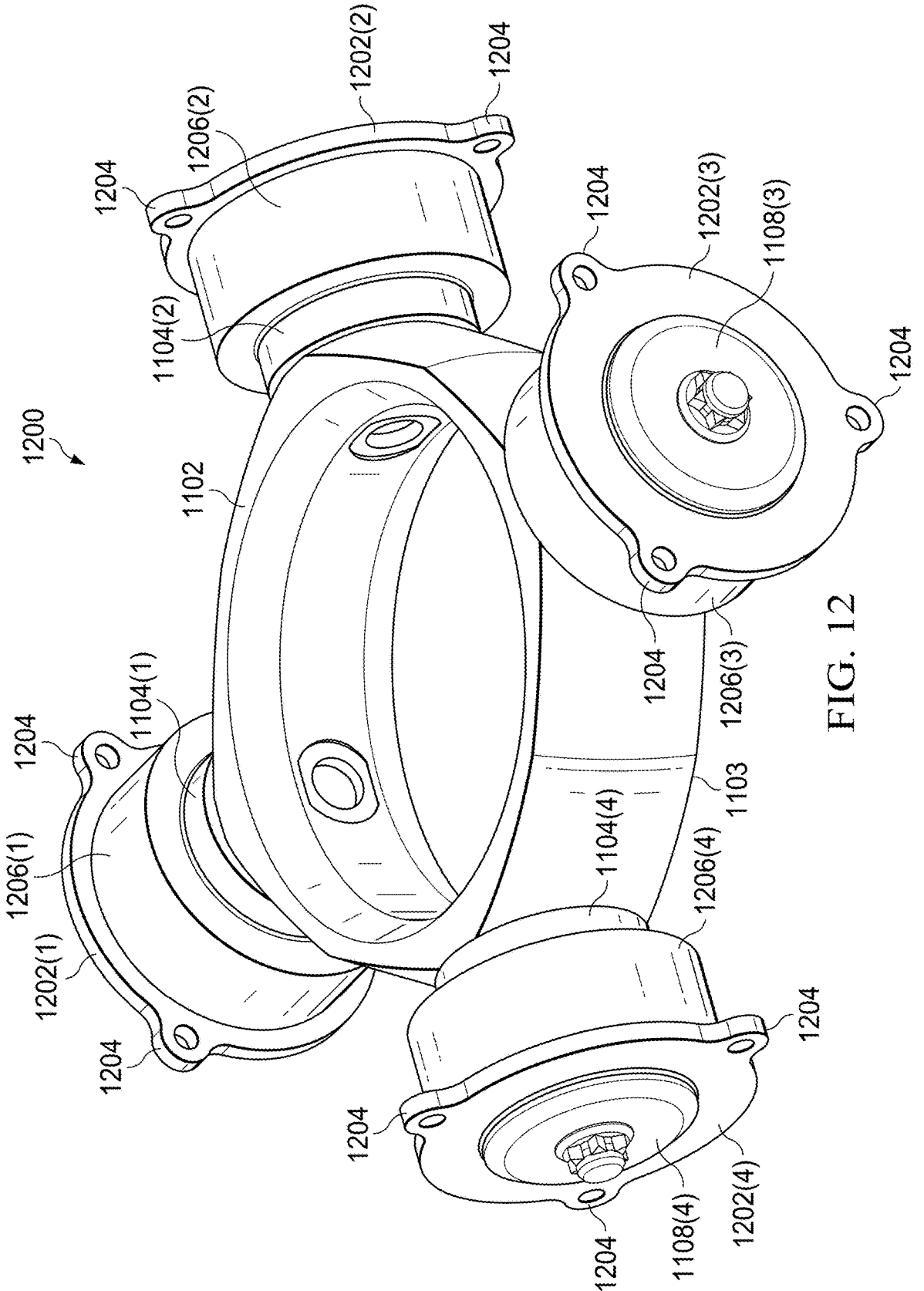
FIG. 12 is a perspective view of a spherical-bearing assembly.

FIG. 12 is a perspective view of a spherical-bearing assembly 1200. The spherical-bearing assembly includes the cross assembly 1100 and four outer-ring assemblies 1202(1)-1202(4) mounted to respective ones of the compression rings 1104(1)-1104(2) and surrounding respective ones of the four inner balls 1106(1)-1106(4). In a typical embodiment, the outer-ring assemblies 1202(1)-1202(4) are swaged to respective ones of the inner balls 1106(1)-1106(4). The inner balls 1106(1)-(4) each form a portion of a spherical bearing as discussed hereinabove. The ball caps 1108(1)-1108(4) are shown on an outboard surface of respective ones of housings 1206(1)-1206(4) of the outer-ring assemblies 1202(1)-1202(4). Internal to each of the four outer-ring assemblies 1202(1)-1202(4) is an outer ring that mates with and holds captive an outer surface of a respective one of the four inner balls 1106(1)-1106(4) and relative to which one of the four inner balls 1106(1)-1106(4) is free to rotate. The four outer-ring assemblies 1202(1)-1202(4) each have formed therein a plurality of mounting tabs 1204 having a through hole formed therein for mounting the outer-ring assemblies 1202(1)-1202(4) to a pair of yokes (not shown) to form a universal joint. In a typical embodiment, a first yoke is a fork driver and a second yoke is a drive plate of a rotor hub of an aircraft.

Various materials may be used to form a spherical bearing out of the inner balls 1106(1)-1106(4) and outer rings of the outer-ring assemblies 1202(1)-1202(4). For example, a spherical bearing so formed may be a metallic/ceramic style bearing or an elastomeric spherical style of bearing. The outer surface of the inner balls 1106(1)-1106(4) and the inner surface of the outer ring are substantially spherical and slide relative to one another via, for example, a lubricant, a liner such as polytetrafluoroethylene ("PTFE"), or a race of ball bearings.

Figure 13:
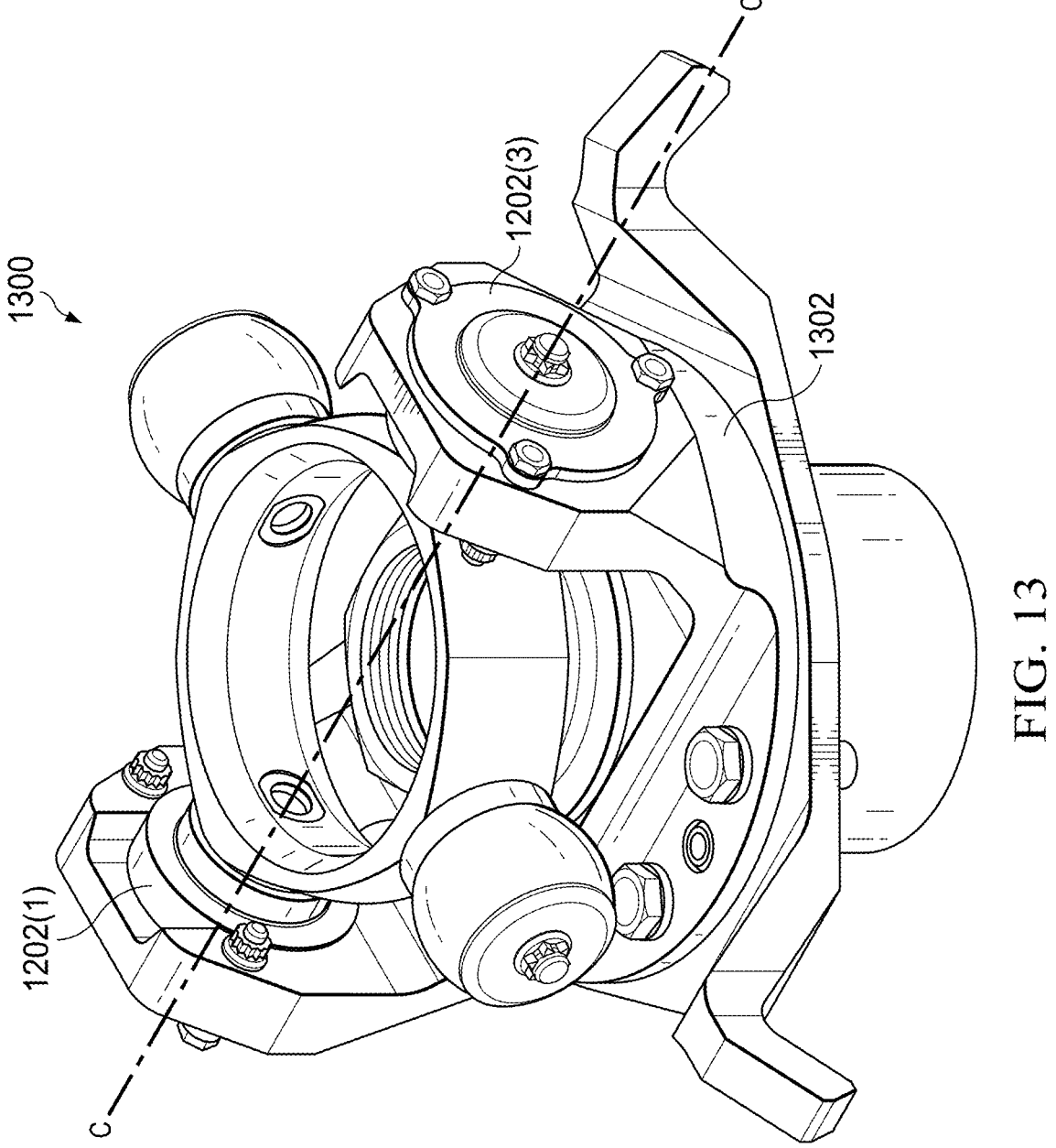
FIG. 13 is a perspective view of a fork-driver spherical-bearing assembly.

FIG. 13 is a perspective view of a fork-driver spherical-bearing assembly 1300. The fork-driver spherical-bearing assembly 1300 includes the spherical-bearing assembly 1200 and a fork driver 1302. The outer-ring assemblies 1202(1) and 1202(3) are shown mounted to the fork driver 1302 such that the cross assembly 1100 can rotate about an axis C relative to the fork driver 1302. In addition, because the outer-ring assemblies 1202(1) and 1202(3) and the inner balls 1106(1) and 1106(3) (not shown) in combination form spherical bearings, loads that needle bearings cannot adequately react to, such as, for example, axial loads along the axis C, can be readily handled.

Figure 14:
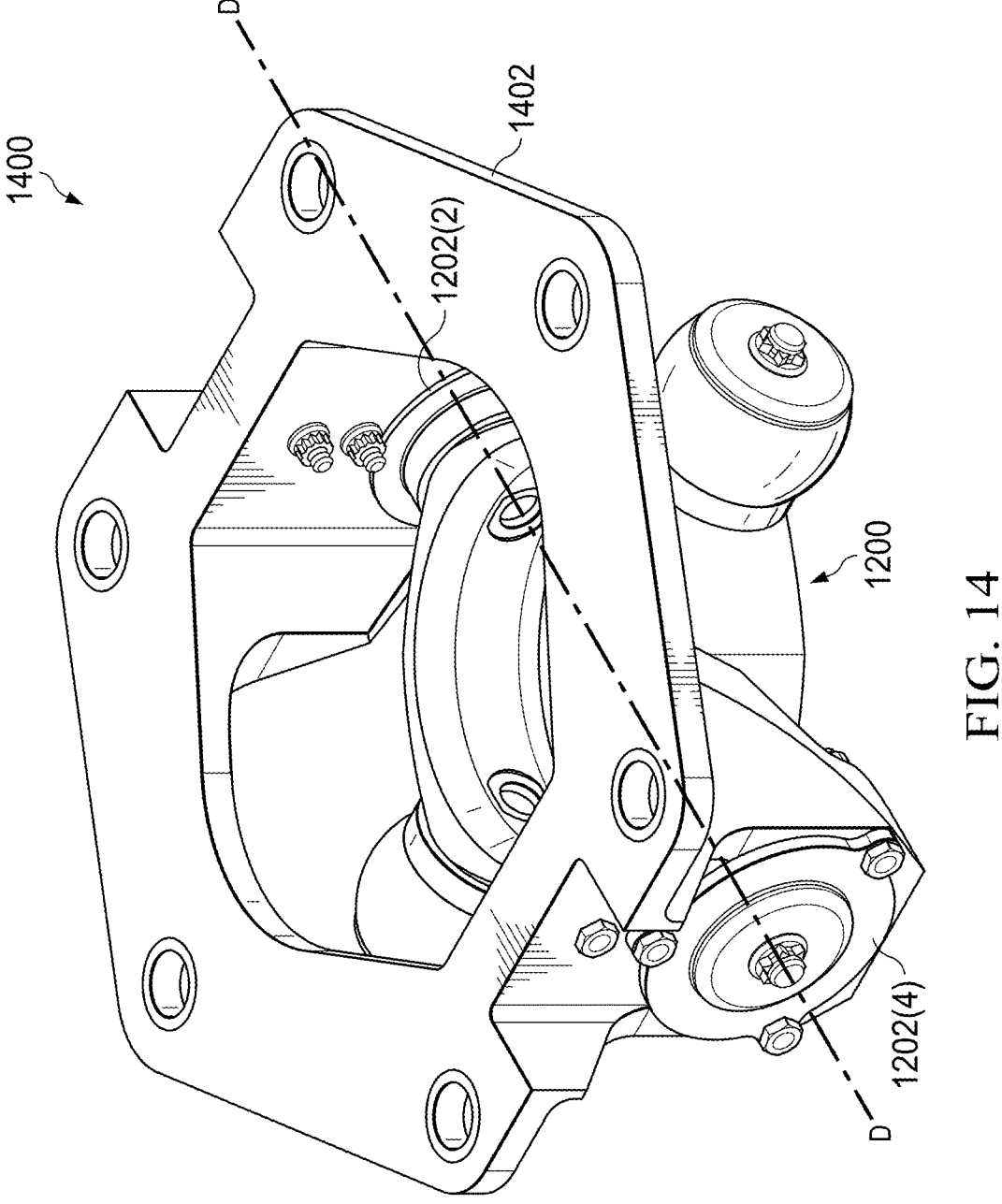
FIG. 14 is a perspective view of a drive-plate spherical-bearing assembly.

FIG. 14 is a perspective view of a drive-plate spherical-bearing assembly 1400. The drive-plate spherical-bearing assembly 1400 includes the spherical-bearing assembly 1200 and a drive plate 1402. The outer-ring assemblies 1202(2) and 1202(4) are shown mounted to the drive plate 1402 such that the cross assembly 1100 can rotate about an axis D relative to the drive plate 1402. In addition, because the outer-ring assemblies 1202(2) and 1202(4) and the inner balls 1106(2) and 1106(4) (not shown) in combination form spherical bearings, loads that needle bearings cannot adequately react to, such as, for example, axial loads along the axis D, can be readily handled.

Figure 15:
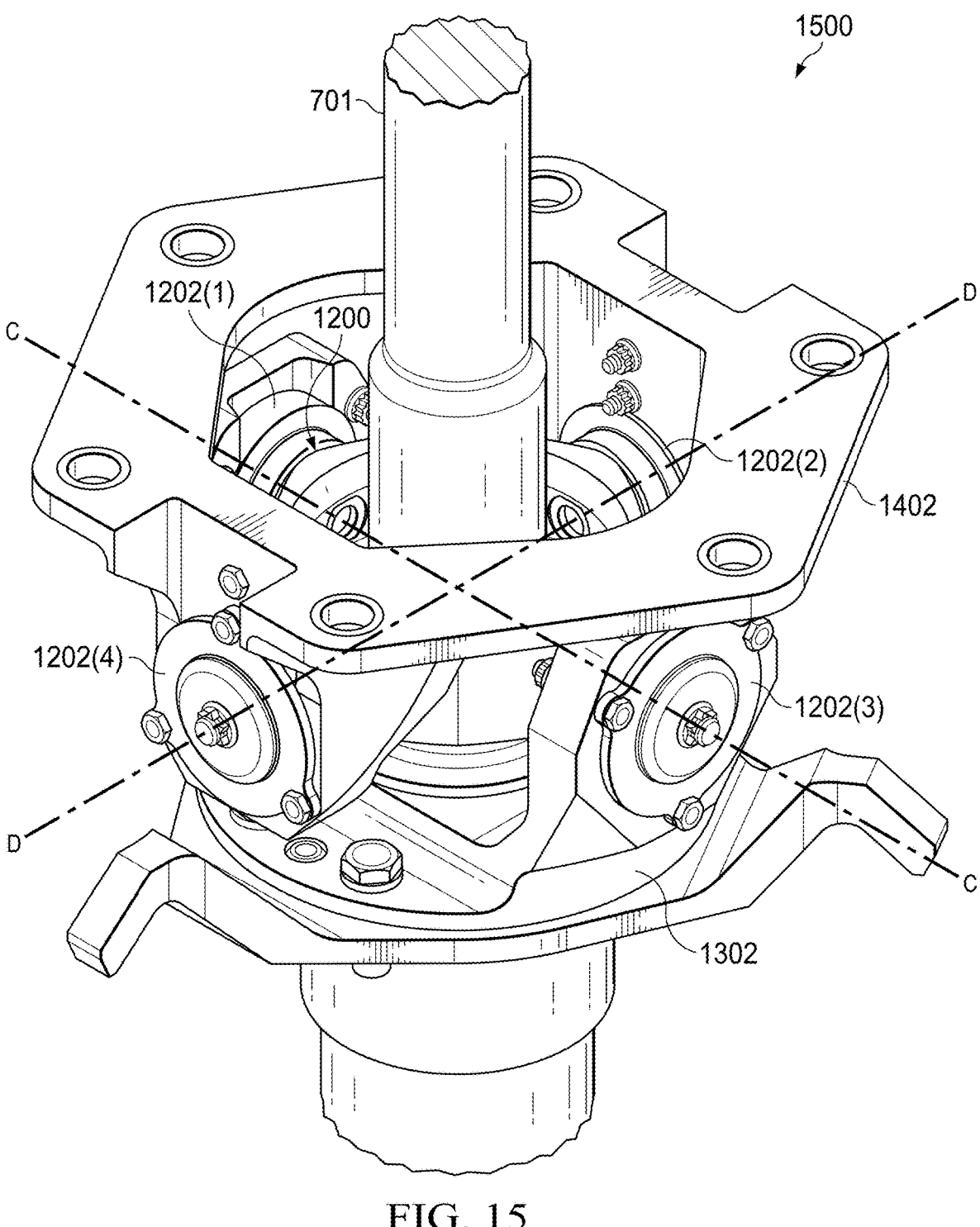
FIG. 15 is a perspective view of a rotor-hub spherical-bearing assembly.

FIG. 15 is a perspective view of a rotor-hub spherical-bearing assembly 1500. The rotor-hub spherical-bearing assembly 1500 includes the spherical-bearing assembly 1200, the fork driver 1302, and the drive plate 1402. The outer-ring assemblies 1202(1) and 1202(3) are shown mounted to the fork driver 1302 such that the cross assembly 1100 can rotate about an axis C relative to the fork driver 1302. In addition, because the outer-ring assemblies 1202(1) and 1202(3) and the inner balls 1106(1) and 1106(3) (not shown) in combination form spherical bearings, loads that needle bearings cannot adequately react to, such as, for example, axial loads along the axis C, can be readily handled. In similar fashion, the outer-ring assemblies 1202 (2) and 1202(4) are shown mounted to the drive plate 1402 such that the cross assembly 1100 can rotate about the axis D relative to the drive plate 1402. In addition, because the outer-ring assemblies 1202(2) and 1202(4) and the inner balls 1106(2) and 1106(4) (not shown) in combination form spherical bearings, loads that needle bearings could not adequately react to, such as, for example, axial loads along the axis D, can be readily handled.

Figure 16:
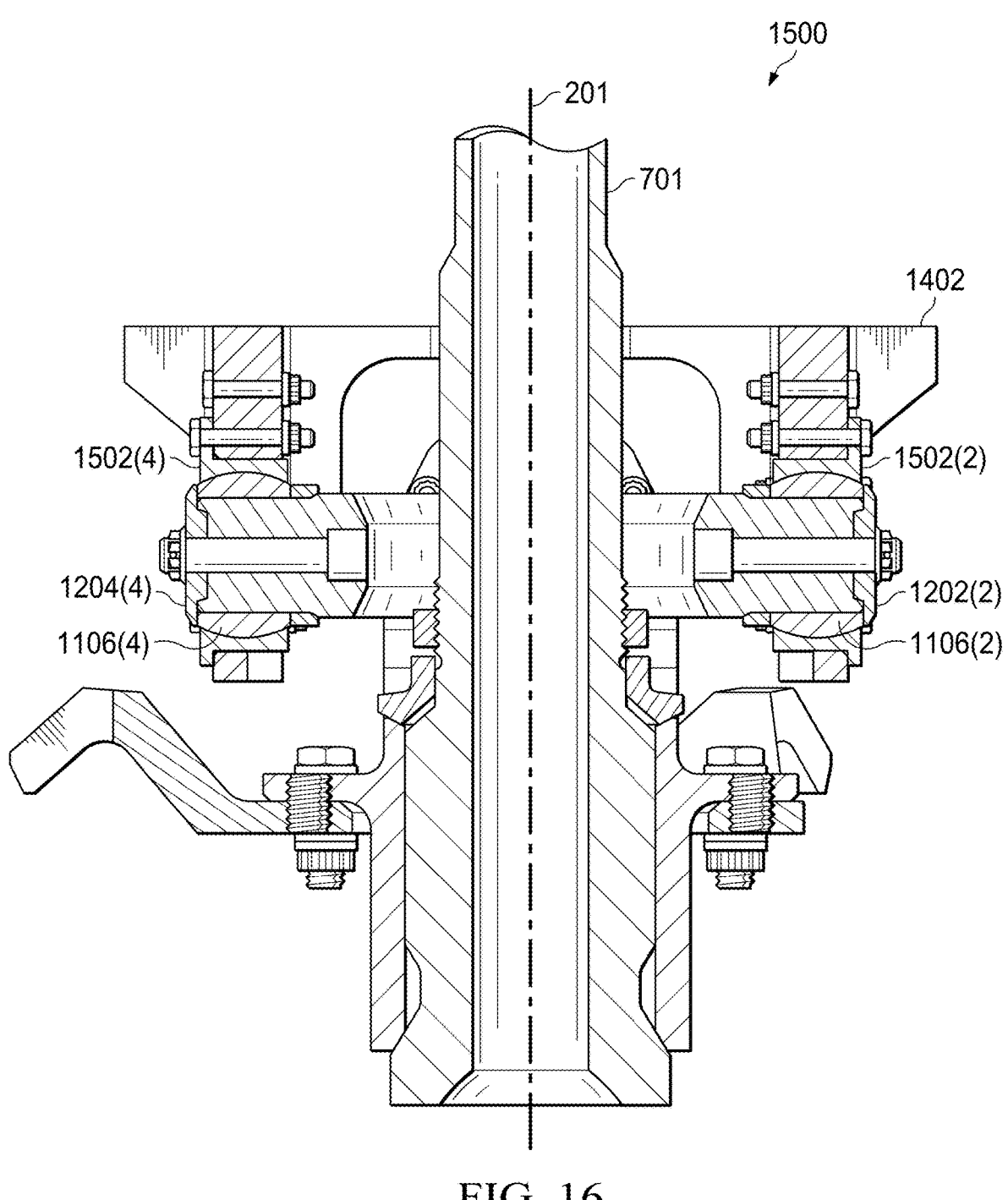
FIG. 16 is a cross-sectional view of the rotor-hub spherical-bearing assembly.

FIG. 16 is a cross-sectional view of the rotor-hub spherical-bearing assembly 1500, the section being taken along the axis D in a plane parallel to the main rotor-axis 201 through the drive plate 1402. Internal to the outer-ring assemblies 1202(2) and 1202(2) are outer rings 1502(2) and 1502(4) that mate with and hold captive an outer surface of a respective one of the inner balls 1106(2) and 1106(4) and relative to which a respective one of the inner balls 1106(2) and 1106(4) is free to rotate.

Figure 17:
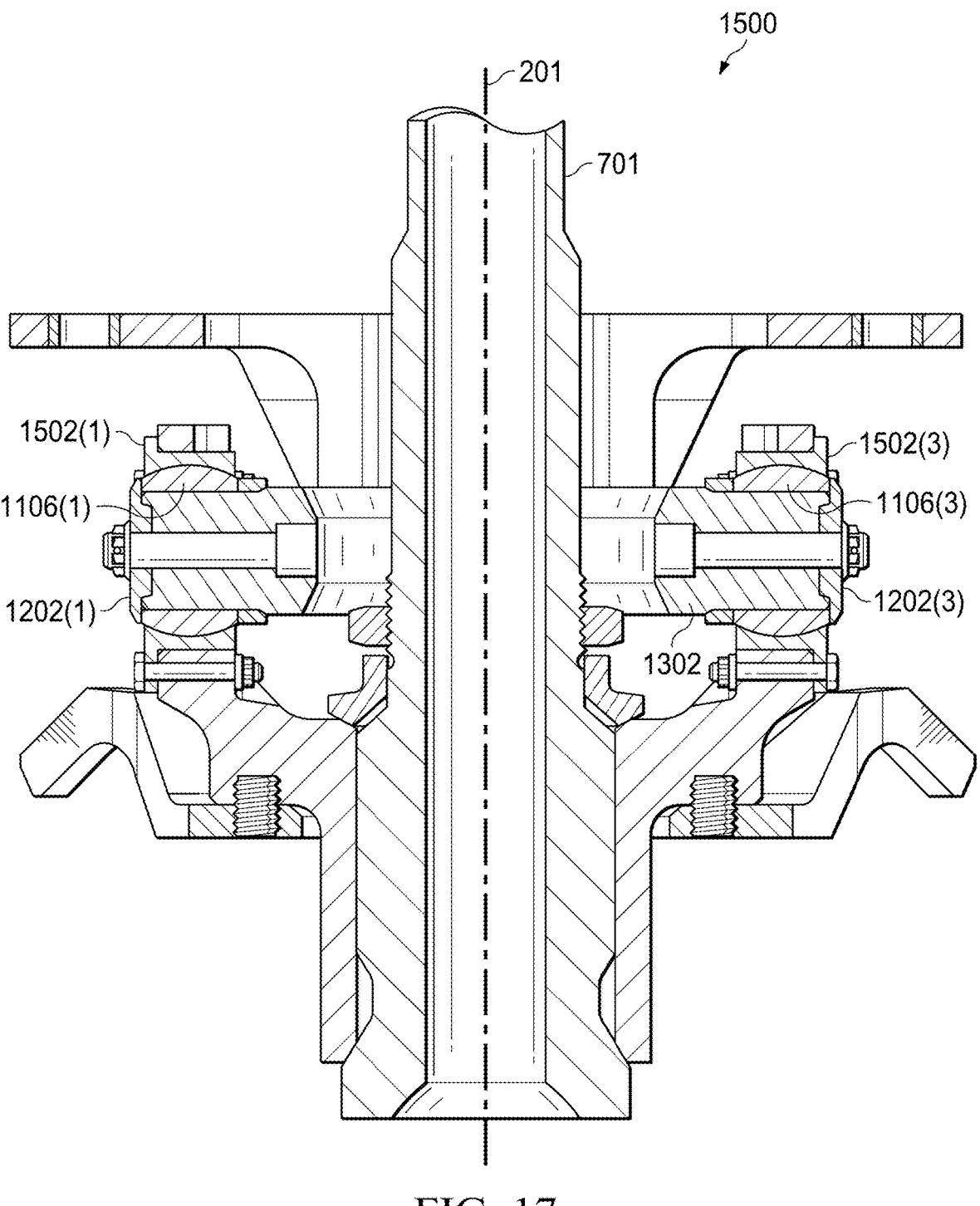
FIG. 17 is a cross-sectional view of the rotor-hub spherical-bearing assembly.

FIG. 17 is a cross-sectional view of the rotor-hub spherical-bearing assembly 1500, the section being taken along the axis C in a plane parallel to the main rotor-axis 201 through the fork driver 1302. Internal to the outer-ring assemblies 1202(1) and 1202(3) are outer rings 1502(1) and 1502(3) that mate with and hold captive an outer surface of a respective one of the inner balls 1106(1) and 1106(3) and relative to which a respective one of the inner balls 1106(1) and 1106(3) is free to rotate.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as inboard, outboard, above, below, upper, lower, or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the terms connect, connection, connected, in connection with, and connecting may be used to mean in direct connection with. Similarly, the terms couple, coupling, and coupled may be used to mean coupled directly or via one or more elements. Conditional language used herein, such as, among others, can, might, may, e.g., and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The terms substantially, approximately, and about are each defined as largely but not necessarily wholly what is specified (and includes what is specified; e.g., substantially 90 degrees includes 0 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as substantially, approximately, and about may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term comprising within the claims is intended to mean including at least such that the recited listing of elements in a claim are an open group. The terms a, an and other singular terms are intended to include the plural forms thereof unless specifically excluded.

What is claimed is:

1. A universal-joint cross assembly comprising:
a ring-shaped cross comprising a ring and four trunnions connected around a periphery of the ring;
four compression rings, each of the four compression rings mounted around a respective one of the four trunnions;
wherein each of the four trunnions is positioned at a 90° interval relative to adjacent ones of the four trunnions;
four inner balls positioned on the four trunnions entirely radially outboard of the four compression rings relative to the ring; and
wherein each of the four inner balls is fixed to one of the four compression rings and forms a portion of a spherical bearing.

2. The universal-joint cross assembly of claim 1, comprising:
four ball caps; and
wherein each of the four ball caps is fixed to an outboard end of one of the four inner balls.

3. The universal-joint cross assembly of claim 2, wherein each of the four ball caps:
comprises a face perpendicular to an axis of rotation of the universal-joint cross assembly formed between opposing pairs of the four compression rings; and
has formed therein a through hole to permit a removable fastener to be used to mount removably an inner ball of the four inner balls relative to a respective one of the four compression rings.

4. The universal-joint cross assembly of claim 1, wherein the four inner balls are formed of metal.

5. The universal-joint cross assembly of claim 1, wherein the four inner balls are formed of a ceramic.

6. The universal-joint cross assembly of claim 1, wherein the four inner balls are elastomeric.

7. The universal-joint cross assembly of claim 1, wherein terminal positions of the ring-shaped cross are on a circumference of the ring of the ring-shaped cross.

\* \* \* \* \*